(12) United States Patent
Terasawa et al.

(10) Patent No.: US 8,331,330 B2
(45) Date of Patent: Dec. 11, 2012

(54) STEPS ONE AND THREE W-CDMA AND MULTI-MODE SEARCHING

(75) Inventors: Daisuke Terasawa, San Diego, CA (US); Deepu John, San Diego, CA (US); Hao Liu, San Diego, CA (US); Qiuzhen (Joe) Zou, La Jolla, CA (US); Sivarama Krishnan Venkatesan, Secaucus, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 12/763,646

(22) Filed: Apr. 20, 2010

(65) Prior Publication Data

US 2010/0202316 A1   Aug. 12, 2010

Related U.S. Application Data

(62) Division of application No. 10/160,874, filed on May 31, 2002, now Pat. No. 7,756,085.

(60) Provisional application No. 60/331,942, filed on Nov. 20, 2001.

(51) Int. Cl.
*H04B 7/216* (2006.01)

(52) U.S. Cl. ........................ 370/335; 370/252

(58) Field of Classification Search .............. 370/328, 370/335, 336, 338, 342, 401, 252, 350
See application file for complete search history.

(56) References Cited

U.S. PATENT DOCUMENTS

| | | | |
|---|---|---|---|
| 6,233,466 B1 * | 5/2001 | Wong et al. ............... 455/562.1 |
| 6,307,840 B1 | 10/2001 | Wheatley et al. | |
| 6,363,108 B1 | 3/2002 | Agrawal et al. | |
| 6,430,170 B1 | 8/2002 | Saints et al. | |
| 6,480,529 B1 | 11/2002 | Sih et al. | |
| 6,480,558 B1 * | 11/2002 | Ottosson et al. ............ 375/350 |
| 6,665,277 B1 * | 12/2003 | Sriram ........................ 370/324 |
| 6,665,288 B1 * | 12/2003 | Ottosson et al. ............ 370/342 |
| 6,681,314 B1 | 1/2004 | Matsuo et al. | |
| 6,717,930 B1 * | 4/2004 | Sezgin et al. ................ 370/335 |
| 6,744,747 B2 | 6/2004 | Shiu et al. | |
| 6,748,010 B1 | 6/2004 | Butler et al. | |
| 6,768,768 B2 | 7/2004 | Rao et al. | |
| 6,775,318 B2 * | 8/2004 | Chen et al. .................. 375/149 |
| 6,813,478 B2 | 11/2004 | Glazko et al. | |
| 6,895,421 B1 | 5/2005 | Dor et al. | |
| 6,922,435 B2 | 7/2005 | Neufeld et al. | |
| 7,130,331 B2 | 10/2006 | Kang et al. | |
| 7,200,162 B2 | 4/2007 | Kang et al. | |
| 7,724,720 B2 * | 5/2010 | Korpela et al. ............. 370/342 |

* cited by examiner

*Primary Examiner* — Ricky Ngo
*Assistant Examiner* — Christine Ng
(74) *Attorney, Agent, or Firm* — Jeffrey D. Jacobs

(57) ABSTRACT

Techniques for efficient searching in asynchronous systems, such as W-CDMA, as well as multi-mode searching, are disclosed. In one aspect, step one and step three search are performed in a single search engine. In another aspect, a search engine is configurable to search the offsets of a slot in step one search, producing sequential hypothesis energies, and peak detecting and sorting those energies. In yet another aspect, the peak detector and sorter are configurable to perform step one searching or step three/multimode searching. Various other aspects of the invention are also presented. These aspects have the benefit of circuit area and search-time efficiency which translate into reduced costs, increased standby time, increased acquisition speed, higher quality signal transmission, increased data throughput, decreased power, and improved overall system capacity.

28 Claims, 10 Drawing Sheets

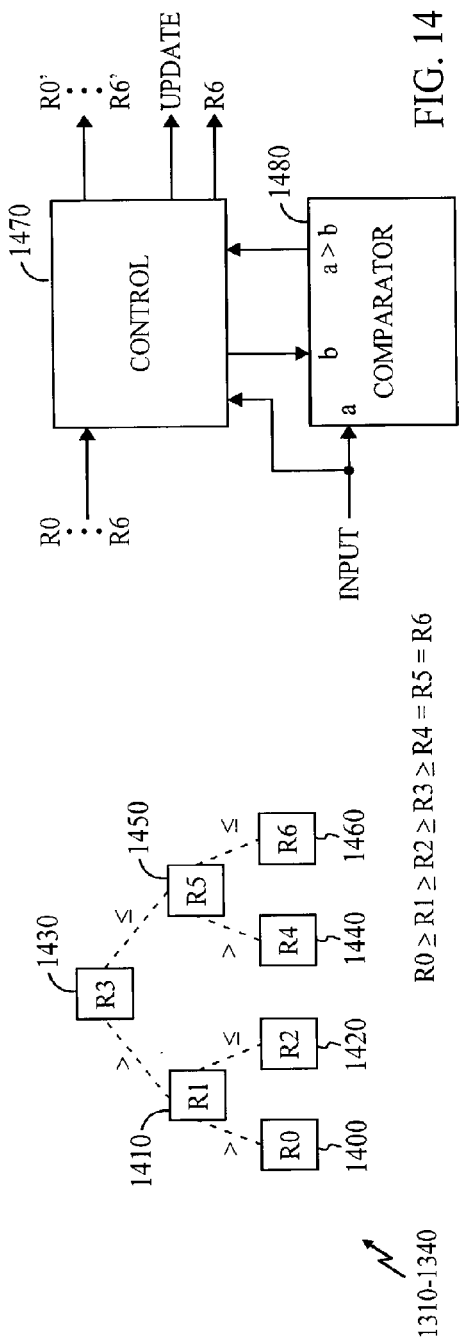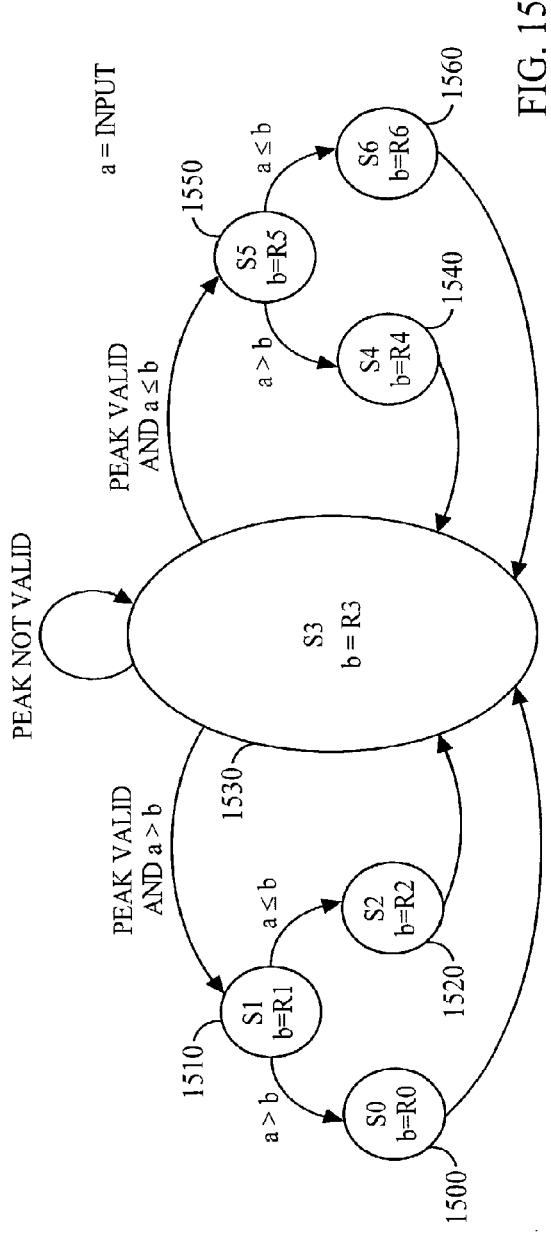

STEPS ONE AND THREE W-CDMA AND MULTI-MODE SEARCHING

RELATED APPLICATIONS

The present application is a divisional of U.S. patent application Ser. No. 10/160,874, titled "STEPS ONE AND THREE W-CDMA AND MULTI-MODE SEARCHING," filed on May 31, 2002, which claims the benefit of U.S. Provisional Application No. 60/331,942, filed Nov. 20, 2001. The above-referenced applications are hereby incorporated by reference in their entireties.

FIELD

The present invention relates generally to communications, and more specifically to a novel and improved method and apparatus for steps one and three W-CDMA searching, as well as multi-mode searching.

BACKGROUND

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ RAKE receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. In some systems, such as IS-95 and cdma2000, base stations are differentiated by transmitting a common PN sequence with a unique offset. Other systems, such as those defined by the W-CDMA standard, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA base stations operate asynchronously in relation to each other, so knowledge of the frame timing of one base station does not translate into knowledge of the frame timing of any other base station. It is possible to search for W-CDMA base stations offset by offset (38,400 of them) for each of the 512 primary scrambling codes. However, this is not practical due to the excessive amount of time such a search would require. Instead, the W-CDMA standard calls for base stations to transmit two additional synchronization channels, the primary and secondary synchronization channels, to assist the subscriber unit in searching efficiently. As a result, W-CDMA search can be performed in three steps, which will be detailed more fully below.

For initial acquisition, the three-step W-CDMA search provides a great performance increase, in terms of reduced search time, over the impractical alternative of searching the entire PN space for each scrambling code. Search time is an important metric in determining the quality of a CDMA system. Decreased search time implies that searches can be done more frequently. As such, a subscriber unit can locate and access the best available cell more often, resulting in better signal transmission and reception, often at reduced transmission power levels by both the base station and the subscriber unit. This, in turn, increases the capacity of the CDMA system (either in terms of support for an increased number of users, or higher transmission rates, or both). Furthermore, decreased search time is also advantageous when a subscriber unit is in idle mode, a low-power state where a subscriber unit is not actively transmitting or receiving voice or data, but is periodically monitoring the system. Reduced search time allows the subscriber unit to spend more time in the low power state, thus reducing power consumption and increasing standby time.

Multimode phones, which may contain multi-mode chipsets, are desirable for communication on a variety of different CDMA and other communication systems, whether they are synchronous or asynchronous, such as those referenced above. Multi-mode searchers are then desirable for performing search tasks within the various communication systems.

W-CDMA searchers designed to reduce search time will accrue the benefits just described. In addition, efficiency of implementation is also important to reduce integrated circuit area and power consumption. Steps one and three of the 3-step search method described above are complex procedures. There is therefore a need in the art for efficient searchers that can perform steps one and three W-CDMA searching, and can also support multi-mode searching.

SUMMARY

Embodiments disclosed herein address the need for efficient searching in asynchronous systems, such as W-CDMA, as well as multi-mode searching. In one aspect, step one and step three search are performed in a single search engine. In another aspect, a search engine is configurable to search the offsets of a slot in step one search, producing sequential hypothesis energies, and peak detecting and sorting those energies. In yet another aspect, the peak detector and sorter are configurable to perform step one searching or step three/multimode searching. Various other aspects of the invention are also presented. These aspects have the benefit of circuit area and search-time efficiency which translate into reduced costs, increased standby time, increased acquisition speed, higher quality signal transmission, increased data throughput, decreased power, and improved overall system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 14 depicts an embodiment of a 7-bin sorter;

FIG. 15 is a state diagram depicting control for a 7-bin sorter;

DETAILED DESCRIPTION

Figure 1:
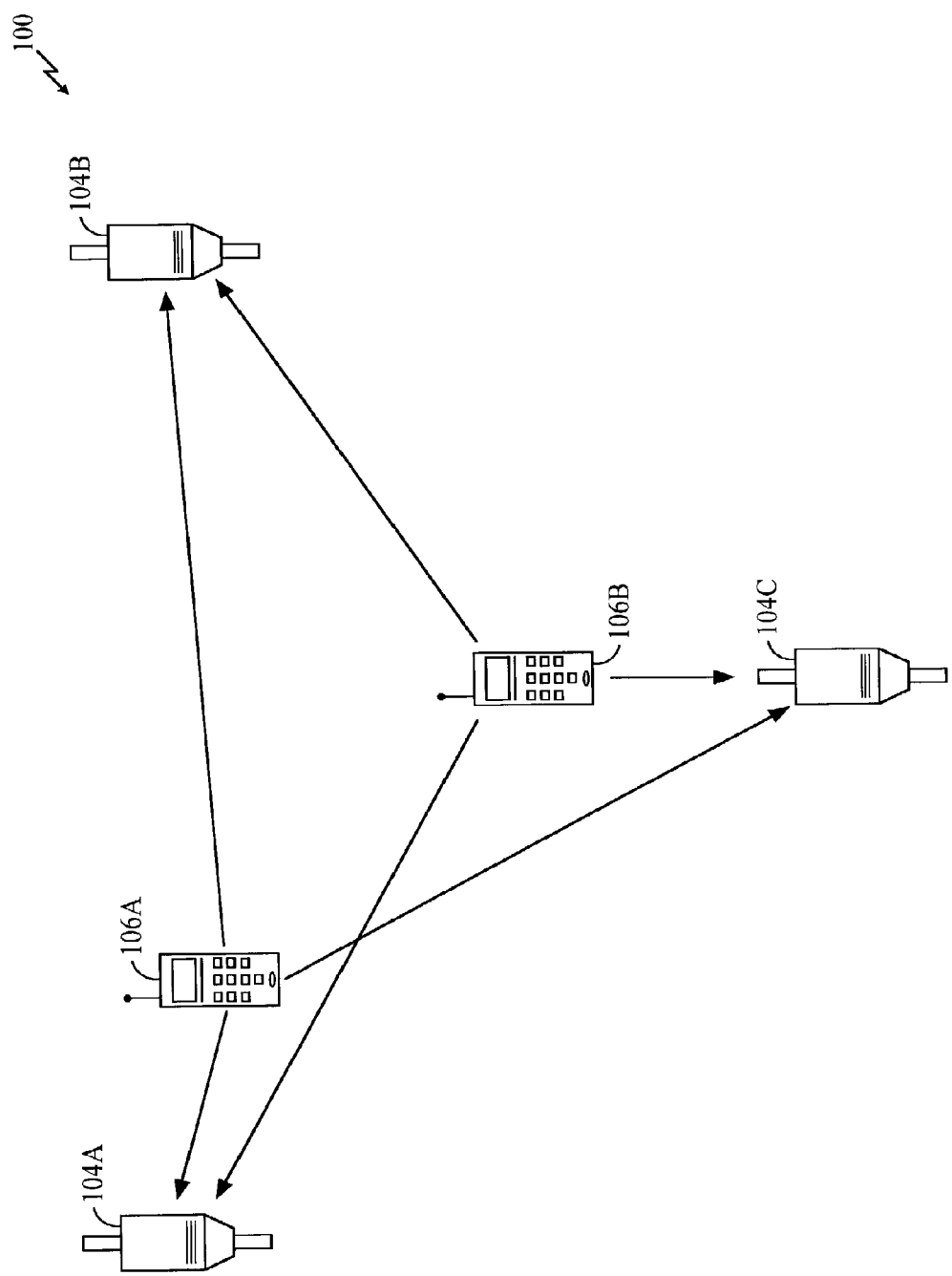
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the W-CDMA standard, the IS-95 standard, the cdma2000 standard, the HDR specification). For simplicity, system 100 is shown to include three base stations 104 in communication with two subscriber units 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term subscriber unit can be used interchangeably with the terms user equipment (UE), mobile station, subscriber station, access terminal, remote terminal, or other corresponding terms known in the art. The term mobile station encompasses fixed wireless applications.

Depending on the CDMA system being implemented, each subscriber unit 106 may communicate with one (or possibly more) base stations 104 on the forward link at any given moment, and may communicate with one or more base stations on the reverse link depending on whether or not the subscriber unit is in soft handoff. The forward link (i.e., downlink) refers to transmission from the base station to the subscriber unit, and the reverse link (i.e., uplink) refers to transmission from the subscriber unit to the base station.

For clarity, the examples used in describing this invention will assume base stations as the originator of signals and subscriber units as receivers and acquirers of those signals, i.e. signals on the forward link. Those skilled in the art will understand that subscriber units as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
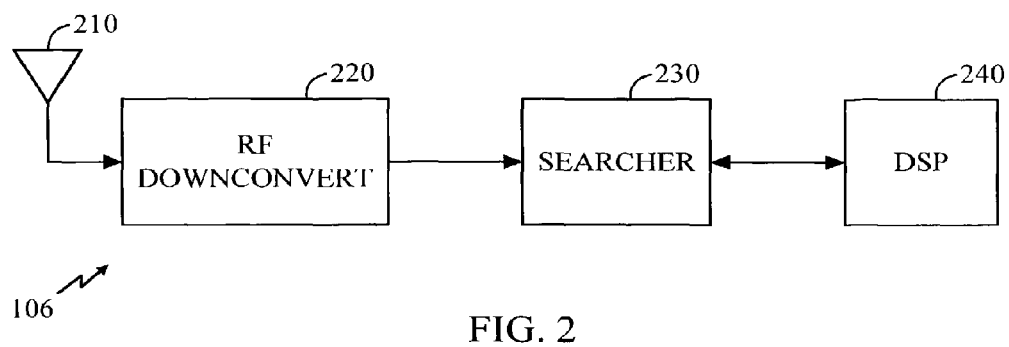
FIG. 2 depicts a subscriber unit configured in accordance with an embodiment of the present invention.

FIG. 2 depicts an embodiment of subscriber unit 106. For clarity, only a subset of the components of a subscriber unit are shown. Signals are received at antenna 210, and delivered to RF downconvert block 220 for amplification, downconversion, and sampling. Various techniques for downconverting CDMA signals to baseband are known in the art. From RF downconvert block 220, I and Q samples are delivered to searcher 230. Note that in alternative embodiments, I and Q samples may be stored in a memory prior to delivery to searcher 230 (details not shown). Searcher 230 is in communication with a digital signal processor (DSP) 240. Alternatives to employing a DSP include using another type of general purpose processor, or specialized hardware designed to carry out various tasks related to searching that might be employed in the DSP. Depending on the capabilities of searcher 230, DSP 240 will may carry out various tasks described in the embodiments below, and coordinate the performance of the remaining tasks in searcher 230. While only one searcher 230 is shown in FIG. 2, any number of searchers can be implemented in parallel in accordance with principles of the present invention. Intermediate values may be computed at any point in the processes and apparatuses described below in searcher 230 for delivery to DSP 240 for subsequent processing. DSP 240 may return processed intermediate values to searcher 230 for subsequent processing as well. Various alternative configurations of DSP/dedicated hardware will be clear to those of skill in the art and fall within the scope of the present invention.

Recall that W-CDMA searching can be carried out using a three-step procedure. In step one, the subscriber unit searches for the primary synchronization code (PSC), a component of the primary synchronization channel. The PSC is a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

In step two, the subscriber unit searches for the secondary synchronization codes (SSCs), which make up the secondary synchronization channel. There are 16 256-chip SSCs. Each base station transmits one SSC, along with the PSC, in the first 256 chips of every slot (each of the 16 SSCs and the PSC are orthogonal). There are 64 unique sequences of 15 SSCs, each sequence being associated with one of 64 scrambling code groups. Each base station transmits one SSC sequence (15 SSCs per frame) corresponding to the code group containing that base station's scrambling code. The set of 64 SSC sequences are selected to be comma free; that is, no sequence is equal to a cyclic shift of any of the other sequences or any non-trivial cyclic shift of itself. Because of this property, once a subscriber unit determines the sequence of SSCs transmitted in any 15 consecutive slots, it can determine both the frame timing and which of the 64 SSC sequences was transmitted, thus identifying the scrambling code group in which the base station belongs. Since there are eight codes in each scrambling code group, the number of candidates has been reduced to eight.

In step three, the eight scrambling code candidates identified in step two must be searched to determine which one is the correct code. This can be carried out by performing a chip-by-chip correlation, accumulating energies over some number of chips until a decision can be made.

Figure 3:
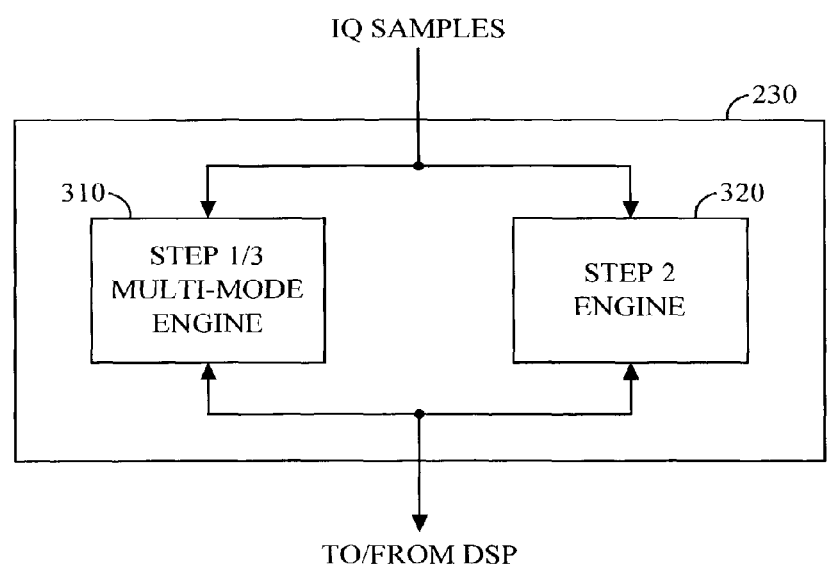
FIG. 3 depicts an embodiment of a searcher for performing the three-step W-CDMA search procedure, as well as other search procedures.

FIG. 3 depicts an embodiment of searcher 230. Searcher 230 comprises two engines for performing the three-step search procedure described above. Search engine 310 receives I and Q samples and performs one of a number of search procedures, while communicating with DSP 240 for control and to deliver search results. Various embodiments of a step 1/3 multi-mode search engine 310 will be described in further detail below, which will highlight the benefits of combining the various search tasks into one engine. This engine is suitable for performing step one W-CDMA search (and similar searches), step three W-CDMA search (and similar searches), as well as searching for other communication standards such as cdma2000 or IS-95. This type of search engine is useful for exclusively searching W-CDMA systems, since it efficiently combines steps one and three. It can also be configured for multi-mode applications, where a subscriber unit needs to be able to communicate with a number of communication systems, such as W-CDMA, cdma2000, and IS-95.

Step 2 search engine 320 receives I/Q samples, and performs step two search (and similar searches), while communicating with DSP 240 for control and to deliver search results. The results of step one searching from search engine 310 may be delivered to search engine 320 for step two searching. The results of step two searching in search engine 320 may be delivered for step three searching in search engine 310. An exemplary step 2 engine 320 is described in co-pending U.S. patent application Ser. No. 09/957,377, entitled "Method & Apparatus for Step Two W-CDMA Searching", filed Sep. 19, 2001, and assigned to the assignee of the present invention.

Search engine 310 can also be used without a corresponding step 2 engine. One example is handoff searching, where step two can be eliminated, and only steps one and three are required to locate a neighboring pilot. Such a method is described in co-pending U.S. patent application Ser. No. 09/935,505, entitled "Method & Apparatus for W-CDMA Handoff Searching", filed Aug. 22, 2001, and assigned to the assignee of the present invention.

Recall that the first step of the three-step W-CDMA search procedure is to acquire slot timing. Slot timing can be acquired by determining the timing of the Primary Synchronization Code (PSC) transmitted in the first 256 chips of each slot. Locating the PSC requires searching a 2,560-chip window (the length of the a slot) for the start of the PSC. It is common practice in CDMA searching to search windows in half-chip steps (although any other granularity of chips, including full chips, falls within the scope of the present invention.) Assuming half-chip searching, a total of 5,120 slot timing hypotheses need to be searched.

The step one search procedure can be described in more detail as follows. Let s=0, 0.5, 1, 1.5, . . . 2559, 2559.5, where s is a hypothesis index (note that there are 5,120 hypothesis indices). Let the input samples be denoted $X_0$, $X_{0.5}$, $X_1$, $X_{1.5}$ and so on. Let M be the non-coherent accumulation interval. To test a hypothesis s, the 256-chip PSC is correlated with $(X_{2560m+s}, X_{2560m+s+1}, \ldots X_{2560m+s+255})$, for m=0, 1, . . . M−1. The squared magnitudes ($I^2+Q^2$) of these correlations are then added (non-coherent accumulation) to get an energy metric $E_s$ for the hypothesis. This procedure is given in equation 1 below, where n is used to index across the 256 chips of the PSC.

$$E_s = \sum_{m}^{M-1} \left| \sum_{n=0}^{255} X_{2560m+s+n} PSC_n \right|^2 \qquad \text{Equation 1}$$

Successive 256-chip coherent accumulations for a particular hypothesis must be separated by 2,560 chips (the slot duration) because of the discontinuous nature of the PSC. The number of non-coherent accumulations, M, can be chosen according to the desired probability of detection vs. false alarm, which is a function of the energy/interference, or $E_c/I_0$ of the PSC, and other factors.

Peaks can be detected among the resulting 5,120 energies calculated for the hypotheses using a variety of techniques known in the art. One example is to locate peaks which exceed a specified threshold. Those peaks can be sorted to determine the most promising candidates for further searching in the second and third steps. Sorting is particularly useful when only a subset of the peaks located will be sent on for further processing under step two or three processing.

Figure 4:
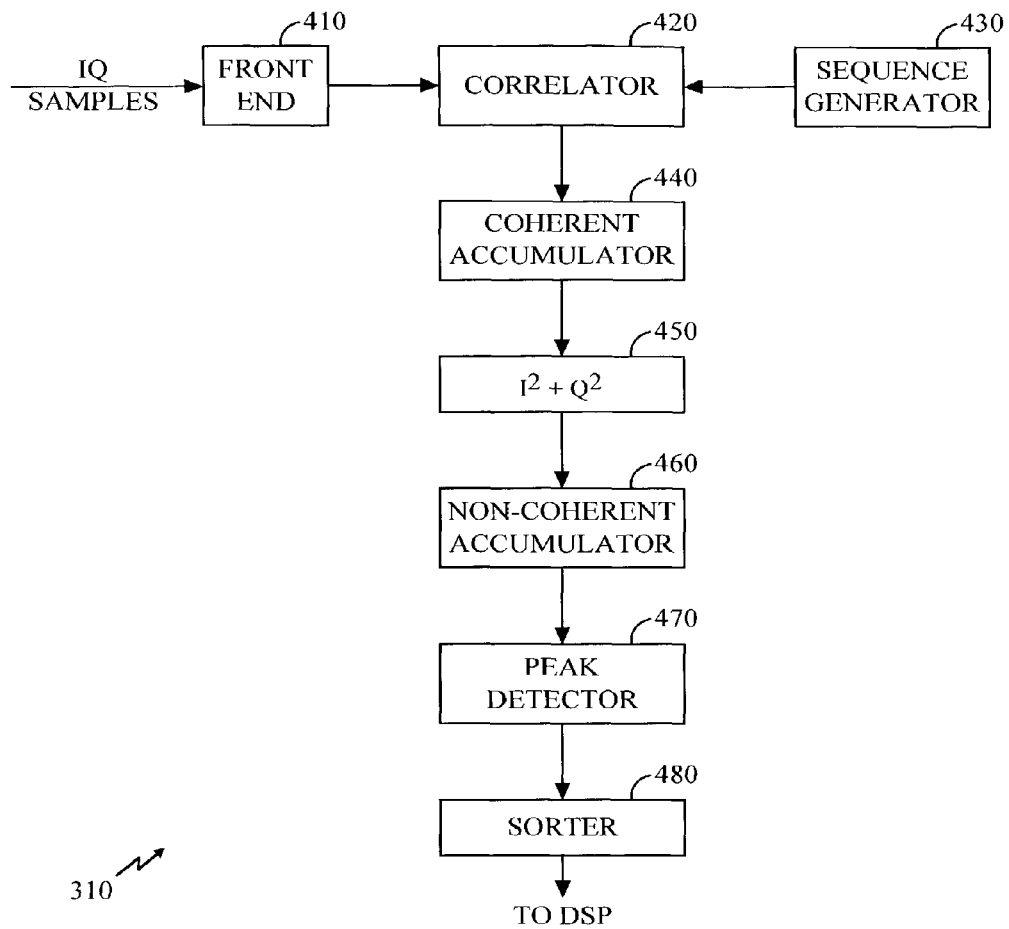
FIG. 4 depicts an embodiment of a search engine which can be configured as a step one search engine, step three search engine, or one of various other search engines.

FIG. 4 depicts an embodiment of search engine 310, which can be configured for step one W-CDMA searching, step three W-CDMA searching, cdma2000 searching, IS-95 searching, or other CDMA searching. Support for any of these search functions can be combined in a deployment of search engine 310. I and Q samples are delivered to optional front end 410 for functions such as code Doppler adjustment, decimation, rotation and the like. In alternate embodiments, a front end may not need to be deployed in search engine 410. One embodiment of front end 410 is described in relation to FIG. 5, below.

I and Q samples are delivered from front end 410 (if one is deployed) to correlator 420, where correlation with a sequence delivered from sequence generator 430 takes place. Correlator 420 can be configured to produce a partial coherent accumulation of a number of chips for each hypothesis being tested. It can also be configured for time-sharing such that more than one hypothesis can be tested in each chip time. Such a correlator can be described as a multi-slice correlator, with each of a plurality of slices operating to correlate each of a plurality of unrelated hypothesis streams. In step one searching, it may be desirable to configure each slice to operate on a portion of the PSC. Details of this procedure will be provided below. In step three and multi-mode searching, the plurality of slices can be configured to perform independent search tasks. An embodiment of such a correlator 420 is described in further detail below with respect to FIGS. 7 and 8. An embodiment of a sequence generator 430 configurable with such a correlator 420 is described in FIG. 6, below.

The partial coherent accumulations for each hypothesis being tested in correlator 420 are delivered to coherent accumulator 440, where they are accumulated for a coherent accumulation interval. The coherent accumulation interval can be different for each hypothesis being tested. In some embodiments, it will be convenient to use a fixed 256-chip coherent accumulation interval for testing PSC hypotheses during step one search. Other coherent accumulation intervals may be appropriate for step three or multi-mode searching. An embodiment of coherent accumulator 440 is described below with respect to FIG. 9.

Note that, for step one searching, it is within the scope of the present invention to deploy a 256-chip correlator rather than a 64-chip correlator. In some embodiments, for step one searching, the coherent accumulation interval is 256 chips (since longer intervals require waiting until the following slot, due to the discontinuous nature of the PSC). In these embodiments, a 256-chip correlator would eliminate the need for a coherent accumulator for step one searching. The circuit could also run at chip×2 instead of chip×8. However, overall search time is not improved in this embodiment, and the shift register in the correlator will become more costly in terms of area (see detailed description of correlator 420 given with respect to FIG. 7, below).

The resultant coherent accumulations are delivered from coherent accumulator 440 for energy calculation in energy calculator 450. A typical energy calculator may perform an $I^2+Q^2$ function on the I and Q portions of the coherent accumulation to produce an energy value. The energy values are delivered to non-coherent accumulator 460 for non-coherent accumulation for each of the hypotheses being tested. Non-coherent accumulation proceeds for a duration specified by the non-coherent accumulation interval, M. A unique M can be programmed for each hypothesis being tested. It may be convenient to set M to a single value for all hypotheses tested in step one searching, but it is not required. An embodiment of a non-coherent accumulator 460 is described below with respect to FIG. 11.

The non-coherent accumulator produces accumulated energy values for each hypothesis, which are delivered to peak detector 470. Peak detector 470 can be configured to detect peaks within a plurality of streams of hypothesis energies, which is particularly useful for step three or multi-mode searching. For step one searching, it may be convenient to use only a single peak detector when searching for a PSC, and peak detector 470 can be so configured. An embodiment of a peak detector 470 is described with respect to FIG. 12, below.

The various blocks described in FIG. 4 can be configured and operated such that a sequence of energy values from non-coherent accumulator 460 can be operated on with a single peak detector component of peak detector 470. This is particularly convenient when performing step one search, because issues involving detecting peaks at the edges of a plurality of streams of energies detected in a plurality of peak detectors can be avoided entirely. Accomplishing this task while utilizing the full power of a multi-slice correlator is complex, and can result in a complex set of procedures for sequence generation in sequence generator 430 and address generation and memory access in coherent and non-coherent accumulators, 440 and 460, respectively. Such a method is described in further detail in conjunction with FIG. 10 below.

The output of peak detector 470 is delivered for sorting in sorter 480. Sorter 480 can comprise a plurality of sorting elements to correspond with the plurality of peak detector elements in peak detector 470. This continues to allow for multiple independent search tasks to be performed, as described above. Sorter 480 can be further configured such that the plurality of sorting elements can be used within a single sorting element. A single sorting element is convenient for step one searching when search engine 310 is configured to produce a single stream of energies for peak detecting in one peak detection element, as described above. An embodiment of such a sorter 480 is described below with respect to FIG. 13.

Figure 5:
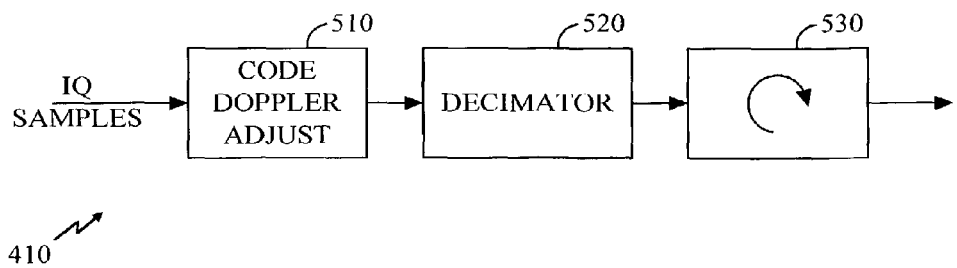
FIG. 5 depicts an embodiment of a search engine front end.

FIG. 5 depicts an embodiment of front end 410. I and Q samples are delivered to code Doppler adjust block 510, where code Doppler adjustment is performed via advance and retard commands delivered from DSP 240. The adjusted samples are delivered for decimation in decimator 520. A common rate for I and Q samples to arrive at front end 410 is chip×8. An exemplary decimator 520 may provide a selectable output rate of chip×2, chip×4, and chip×8(no decimation). The decimated samples are delivered for frequency rotation in rotator 530. In an alternate embodiment, not shown, the components of front end 410 are duplicated to provide a plurality of independently configurable channels. Each channel can have a unique combination of decimation and frequency rotation, with independent advance and retard control for code Doppler adjustment. The resultant I and Q samples from front end 410 are delivered to correlator 420.

Figure 6:
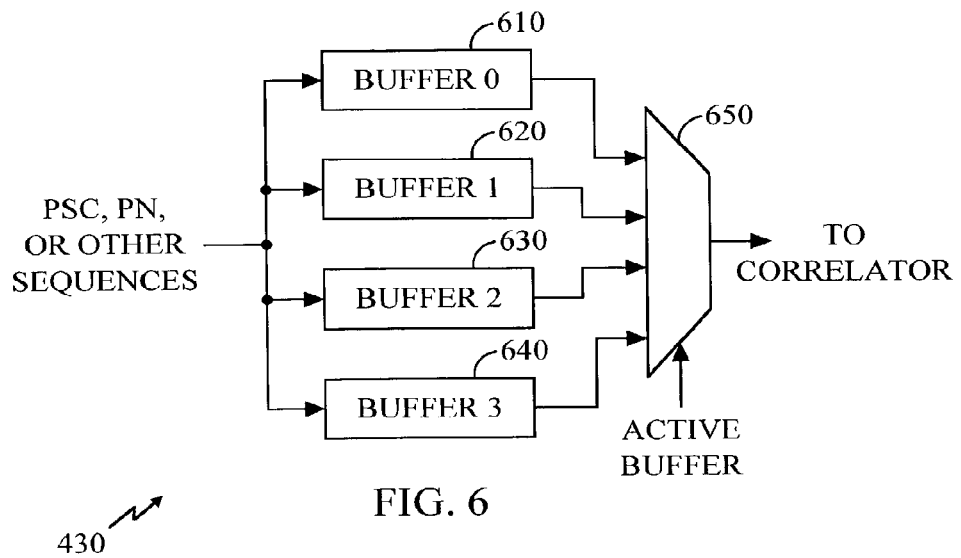
FIG. 6 depicts an embodiment of a sequence generator.

FIG. 6 depicts an embodiment of sequence generator 430. A variety of sequences are generated for use in correlator 420. Examples of sequences include the PSC for step one searching, PN sequences for step three searching, PN sequences of cdma2000 or IS-95, or any other sequence to be used in correlating the I and Q samples received in search engine 310. The sequence generation portions of sequence generator 430 are not shown. As known in the art, dedicated hardware or a DSP can be used to generate sequences. Sequences can be pre-computed and stored in memory. Any combination of these methods can also be used to produce the desired sequences. When used in conjunction with a multi-slice correlator, such as the embodiment of correlator 420 described below with respect to FIG. 7, a plurality of sequences can be used simultaneously. The proper sequence or sequences are selected, according to the mode in which search engine 310 is operating, and delivered to a plurality of buffers. Any number of buffers can be deployed, although it is convenient to match the number of buffers to the number of slices in the multi-slice correlator. In the exemplary embodiment shown in FIG. 6, four buffers 610-640 are deployed. Each buffer 610 640 is 64 chips wide, with storage for an I and Q value for each chip. The width of buffers 610-640 is sized to contain the number of chips required for correlation in correlator 420 during each correlation cycle.

In step one searching, buffers 610-640 can be loaded with the 256 PSC values. The PSC can be pre-computed and stored in memory, or generated in the DSP using the hierarchical structure of the PSC (defined in the W-CDMA standard). Alternatively, a dedicated PSC hardware generator could be deployed to produce the PSC values. Buffer 0 610 is loaded with the first 64 chips of the PSC, chips 0 through 63. Buffer 1 620 is loaded with the second 64 chips of the PSC, chips 64 through 127. Buffer 2 630 is loaded with the third 64 chips of the PSC, chips 128 through 191. Buffer 3 640 is loaded with the final 64 chips of the PSC, chips 192 through 255. The buffers 610-640 do not need to be updated during the step one search procedure. Another alternative for step one searching is to hard code the PSC values, and select them rather than the programmable buffers 610-640 when operating in that mode (details not shown).

In the exemplary embodiment, during step one search, the method for selecting the active buffer is shown in Table 1. The active buffer changes each chip×8 cycle. The active buffer sequence for the first four chips, 0-3, is the same as the sequence for the last four chips, 4-7. The sequence selected is determined by the chip number being processed, denoted n. Each chip n corresponds to eight chip×8 cycles, denoted 0-7. The first 64 chips use the sequence shown in column 0. The second 64 chips use the sequence shown in column 1. The third 64 chips use the sequence shown in column 2. The fourth 64 chips use the sequence shown in column 3. The fifth 64 chips use column 0, and the pattern then repeats. So, to determine the active buffer during any cycle, determine the column by computing (n div 64) mod 4, and the row by the current chip×8 cycle. The active buffer during any cycle can also be calculated as (n div 64 chip×8) mod 4. The usefulness of selecting active buffers according to Table 1 will become clear in light of the method described in FIG. 10 below. This method provides for sequential hypotheses to be output from coherent accumulator 440, energy calculator 450 and non-coherent accumulator 460 thus providing a continuous, sequential stream of hypotheses to be peak detected and sorted in peak detector 470 and sorter 480, the benefits of which were described above.

TABLE 1

| | Active Buffer (n div 64) mod 4 | | | |
|---|---|---|---|---|
| chip×8 | 0 | 1 | 2 | 3 |
| 0, 4 | 0 | 1 | 2 | 3 |
| 1, 5 | 3 | 0 | 1 | 2 |
| 2, 6 | 2 | 3 | 0 | 1 |
| 3, 7 | 1 | 2 | 3 | 0 |

Note that the PSC sequence is equal valued in the real and imaginary space, thus I and Q are equal for each chip, and there is not a need to store both I and Q in each buffer. One alternative is to disregard this fact and simply use a generalized hardware which allows for unique I and Q values, programming the I and Q portions of each buffer with identical information. When deploying a search engine 310 capable of both step one and multi-mode searching, the hardware will need to be deployed regardless. If search engine 310 is deployed as a step one only search engine, then the buffers can contain only one value per chip for correlation. The hard-coded alternative, described above, can easily be adapted to provide both an I and Q output, or a single value per chip.

During step three or multi-mode searching (such as cdma2000 or IS-95), the four buffers can be programmed independently to perform various search tasks. A single PN sequence may be used for searching, with different offsets of the sequence programmed in the buffers at any given time. Alternatively, all the buffers can be programmed with unique sequences, or any combination in between. Generation of the various sequences is defined in the respective standards. A method for updating PN buffers for use in multi-slice correlators is described in co-pending U.S. patent application Ser. No. 09/283,010, entitled "Programmable Matched Filter Searcher", filed Mar. 31, 1999, and assigned to the assignee of the present invention.

The output of one of buffers 610 through 640 is selected in mux 650 via the select signal according to the active buffer. The output of mux 650 is delivered to correlator 420. The active buffer changes each cycle for use in a time slice of correlator 430. Details of how to update the active buffer for use in step one searching are provided below. During step three or multi-mode searching, it may be convenient to simply sequence through the buffers to perform the independent search procedures in each correlator slice. Naturally, the method used for loading the buffers 610-640 and selecting the active buffer must coordinate other blocks of search engine 310, such as coherent accumulator 440 and non-coherent accumulator 460, to produce the desired energy calculations for the various hypotheses being tested. This coordination is detailed further below.

Figure 7:
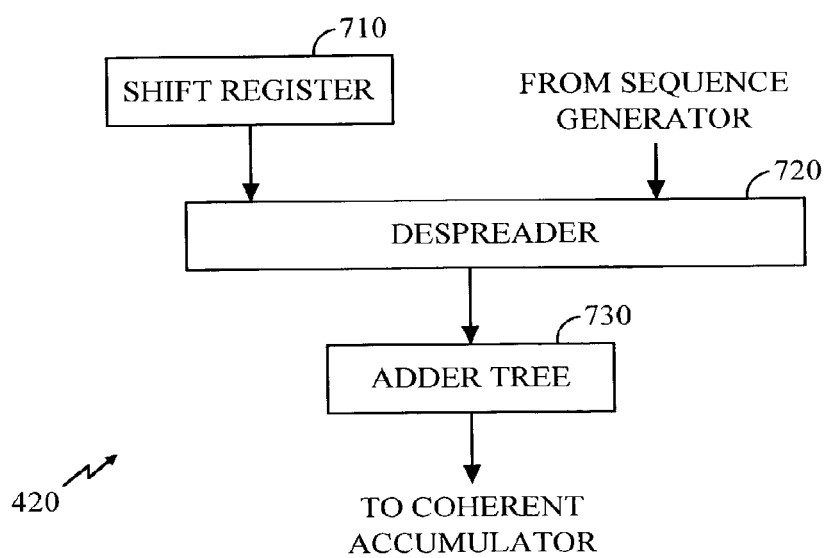
FIG. 7 depicts an embodiment of a correlator, which can be configured to correlate multiple slices.

FIG. 7 depicts an embodiment of correlator 420. I and Q samples are shifted into 128-chip, 64-tap shift register 710. The samples are updated twice per chip in the exemplary embodiment. As such, a new set of 64 I and Q samples will be output from shift register 710 twice per chip duration. In alternate embodiments, different sample rates, wider or narrower shift register lengths, and the corresponding appropriate number of taps can be deployed, as understood by those of skill in the art. The I and Q outputs of shift register 710 are despread with the sequence provided by sequence generator 430. For step three W-CDMA search and other CDMA search tasks, the despreading will be QPSK despreading. As described above in reference to FIG. 6, each PSC chip consists of equal I and Q values. For step one searching, then, BPSK despreading would be sufficient. However, to deploy a search engine capable of performing both step one and step three search, as well as other CDMA searching, it is convenient to simply use one common QPSK despreader with equal valued I and Q sequences used for step one searching. The despread samples are then accumulated in adder tree 730.

During each cycle, the output of adder tree 730 is a 64-chip accumulation of the I and Q samples despread with the active buffer of sequence generator 430. These outputs are delivered to coherent accumulator 440. In some cases, it may be desirable to program the coherent integration length with a finer granularity than 64 chips. This can be accomplished by tapping the adder tree at various stages and allowing those partial results to be selected as outputs. For example, the first 8, 16, and 32 sums may be provided in addition to the full 64. Of course, granularity can be increased to a single chip, with the trade-off of increased complexity and hardware. Details of this alternative are not shown, but the various configuration options will be clear to those of skill in the art.

Recall in the description of front end 410 in FIG. 5 that an alternative embodiment would replicate the components of a front end to produce a plurality of independent channels. An alternate embodiment of correlator 420 allows these channels to be correlated simultaneously. Inserting selectable inputs at various stages along shift register 710 allows the correlator to be configured such that in one mode the shift register operates as a single shift register, and in another mode it operates as a plurality of independent shift registers. By providing corresponding taps in the adder tree for selection as outputs, correlator 420 can operate as a plurality of independent correlators. The various sequence buffers in sequence generator 430 can be loaded such that segments of the buffer correspond to the code for despreading the corresponding segment of the shift register. As an example, the 128-chip length shift register 710 can be broken up into 8 16-chip shift registers by muxing in an alternate input to every $16^{th}$ register element in the shift register. These alternate inputs can be fed from eight independent front end channels contained in front end 410. Eight independent outputs can be generated by tapping the adder tree in eight locations, two stages deep. The shift register can also be configured for segmentation into fewer shift registers of greater length by utilizing fewer than the maximum number of the alternate shift register inputs. For example, the shift register can be broken into two 64-chip shift registers by selecting an alternate input to the $64^{th}$ shift register element.

The two corresponding outputs can be generated by tapping the adder tree at the two penultimate adder stages prior to the final add. This mode is not used in step one searching, but can be useful for certain multi-mode search tasks such as Global Positioning System (GPS) pilot searching. The details of this alternative are not shown. The myriad combinations available using these principles will be clear to those of skill in the art in light of this teaching. A multi-slice correlator configured for multiple pilot searching is described in co-pending U.S. patent application Ser. No. 09/468,556, entitled "Programmable Matched Filter Searcher For Multiple Pilot searching", filed Dec. 21, 1999, and assigned to the assignee of the present invention.

Figure 8:
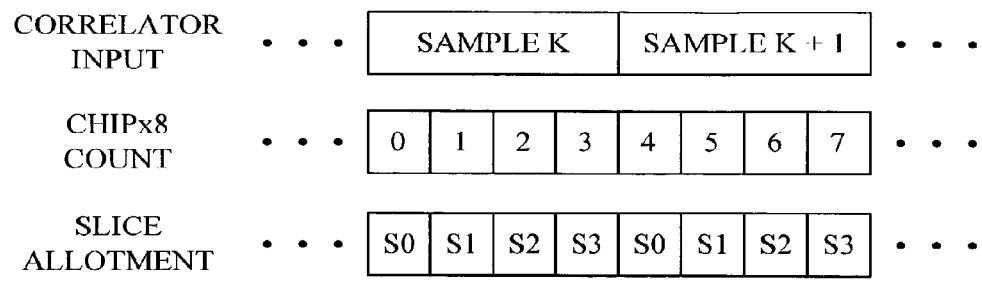
FIG. 8 is a diagram showing how a multi-slice correlator can be allocated for use in embodiments of the present invention.

FIG. 8 depicts the relationship between incoming I and Q samples, cycle time, and slice allotment in a multi-slice correlator as configured for use with the present invention. In the exemplary embodiment, the cycle time is chip×8, or eight times the chip rate. Thus there are eight cycles during each chip for search tasks to be performed. The sample rate is chip×2, or twice the chip rate, so two hypotheses will be searched each chip. The two hypotheses during one chip time are commonly referred to as "on-time" and "late". The exemplary embodiment is configured with four slices, supported by the four sequence buffers 610-640 described above in relation to FIG. 6. Each of the four slices operates in one cycle on one set of samples to produce a partial correlation for a hypothesis. Since there are two hypotheses generated per chip, and four slices, a total of eight cycles are required per chip. Therefore, with a cycle time of chip×8, all the available cycles in correlator 420 are utilized. This relationship is shown in FIG. 8. Sample k is valid as the correlator input for the first four chip×8 cycles 0-3. The results in the shift register remain constant for this duration as well. Since the input is updated at twice the chip rate, sample k+1 will arrive at the correlator input for the last four chip×8 cycles, 4-7. The shift register contents will shift and then remain constant for this period. The four slices, denoted S0 through S3, each are allocated one cycle for each sample, as shown. Slice S0 operates on sample k, the on-time sample, in chip×8 cycle 0. Slice S0 operates on sample k+1, the late sample, in chip×8 cycle 4. Slice S1 operates on the on-time and late samples in cycles 1 and 5, respectively. Slice S2 operates on the on-time and late samples in cycles 2 and 6, respectively. Slice S3 operates on the on-time and late samples in cycles 3 and 7, respectively.

Figure 9:
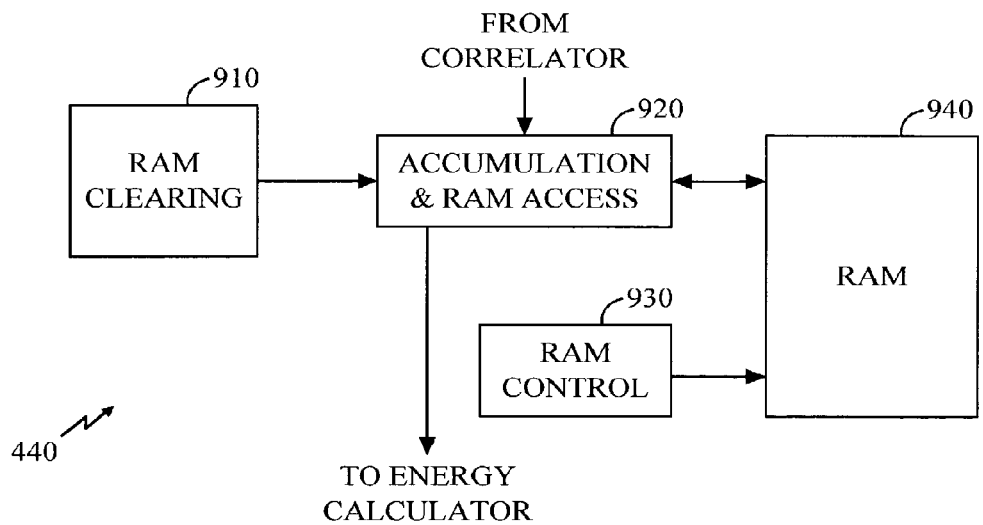
FIG. 9 depicts an embodiment of a coherent accumulator.

FIG. 9 depicts an embodiment of coherent accumulator 440. Recall that correlator 420 performs a maximum of 64 chips of coherent accumulation during each clock cycle. To coherently accumulate more than 64 chips, the 64-chip partial sums are stored in RAM 940 for each of the hypotheses. When the next 64 chips of coherent accumulation for a hypothesis are calculated in correlator 420, the previously calculated value stored in RAM is retrieved, added to the new value, and the result is written back into RAM 940. Partial accumulation values corresponding to hypotheses correlated in correlator 420 are delivered to accumulation and RAM access block 920. Each hypothesis has a corresponding memory location in RAM 940, the address of which is determined by RAM control 930. If coherent accumulation is in progress for a particular hypothesis delivered to accumulation and RAM access block 920, then an intermediate result corresponding to that hypothesis, stored in RAM 940, is retrieved, summed with the partial accumulation value from correlator 420, and the result is stored in RAM 940, overwriting the previous intermediate value. When coherent accumulation is just beginning for a particular hypothesis, the incoming partial accumulation value can be simply stored in the appropriate address since no summing is required. When coherent accumulation is completed, no RAM write needs to occur. Instead, the result of the summation is delivered to energy calculator 450.

RAM clearing block 910 controls the beginning and end of the coherent accumulation for each hypothesis. Each hypothesis can have a unique coherent accumulation interval length. In the exemplary embodiment, there can be a unique coherent accumulation interval length per slice. One method is to initialize the RAM 940 with all zeros prior to any coherent accumulation. Subsequently, whenever coherent accumulation for a hypothesis is completed, a zero is written to the corresponding address location so that the intermediate value will be reset for the beginning of the next coherent accumulation using that RAM address. Alternately, the intermediate value stored in RAM can simply be ignored and no sum calculated for the initial partial accumulation value of the hypothesis.

When the search engine is operating at full capacity, RAM 940 will need to be read from and written to once per cycle. One option to meet this throughput requirement is to deploy a dual-port RAM. Another method is to double-pack a single-port RAM. A double-packed RAM will be deployed in the exemplary embodiment described in further detail below.

During coherent accumulation, in every cycle a RAM location is read out, added to the correlator output, and written back into the same RAM location. Single-port RAMs allow only one read or one write in a single cycle. Since, on average, the ability to read and write every clock cycle is needed, two accumulation results are double-packed into one word in RAM to achieve the throughput. Thus, one RAM address location stores a pair of I values and a pair of Q values. A buffer is used to store one set of I and Q values to be written while the second set is calculated. Then both are stored at once to the single RAM location. Similarly, after a read access to the RAM returns two sets of I and Q values, a buffer stores one set for subsequent use while the other set is used in accumulation. Reads and writes to the RAM occur in alternate clock cycles. Note that packing two results in one word does not prevent the two corresponding hypotheses from having different accumulation intervals.

In the exemplary embodiment, 128 hypotheses are maintained in the coherent accumulator 440 for each of the four correlator slices. Thus a total of 512 hypotheses are maintained simultaneously. Since results for two hypotheses are stored in a single RAM location, a total of 256 addresses are used. Table 2 shows how an embodiment of RAM 940 is partitioned and used during step one searching.

Note that this embodiment assumes a coherent accumulation interval of 256 chips for step one searching, i.e. coherent accumulation occurs only within a single slot. This is convenient since the PSC is only transmitted in the first 256 chips of a slot, and to increase the coherent interval requires waiting for the next slot. Depending on the frequency drift, and other factors, in some instances the coherence bandwidth may not allow the coherent interval to cross multiple slots, although in handoff searching the frequency error may be negligible. If coherent accumulation is desired across slots, RAM 940 will need to be increased to 10 times its size (for a discussion on the relative sizes of coherent and non-coherent accumulator RAM sizes, see the description of Tables 4 and 5 below.

Table 2 shows how hypotheses are double-packed in RAM 940. Note that each RAM address contains two RAM cells, where a RAM cell is defined to contain the I and Q portion of a single hypothesis. RAM cells are addressed sequentially corresponding to increasing RAM address. So, cell 0 is the lower half of RAM address 0 and cell 1 is the upper half of RAM address 0. Cell 2 is the lower half of RAM address 1 and cell 3 is the upper half of RAM address 1, and so forth. The RAM address of any cell is the cell address div 2. Cell address mod 2 identifies whether the lower or upper half of the RAM address is used (i.e. cell address mod 2=0 goes in the lower half and cell address mod 2=1 goes in the upper half). (The index k shown in Table 2 is for instructional purposes only. The relative spacing shown in Table 2 is only accurate for k equal to integer multiples of 256, and only at chip times equal to k+255. In between those chip times, only portions of the relative spacing shown will be accurate, due to various hypotheses finishing and new hypotheses being initiated. This process will be understood in light of the discussion relating to Table 3, below.)

TABLE 2

| Address | | MSB | | | LSB |
|---|---|---|---|---|---|
| | 0 | I H(k + 64) | Q H(k + 64) | I H(k) | Q H(k) |
| | 1 | I H(k + 192) | Q H(k + 192) | I H(k + 128) | Q H(k + 128) |
| | 2 | I H(k + 64.5) | Q H(k + 64.5) | I H(k + 0.5) | Q H(k + 0.5) |
| | 3 | I H(k + 192.5) | Q H(k + 192.5) | I H(k + 128.5) | Q H(k + 128.5) |
| | ... | | | | |
| | 255 | I H(k + 255.5) | Q H(k + 255.5) | I H(k + 191.5) | Q H(k + 191.5) |

For step three and multimode searching, coherent integration can be performed as described below in relation to Table 5.

Figure 10:
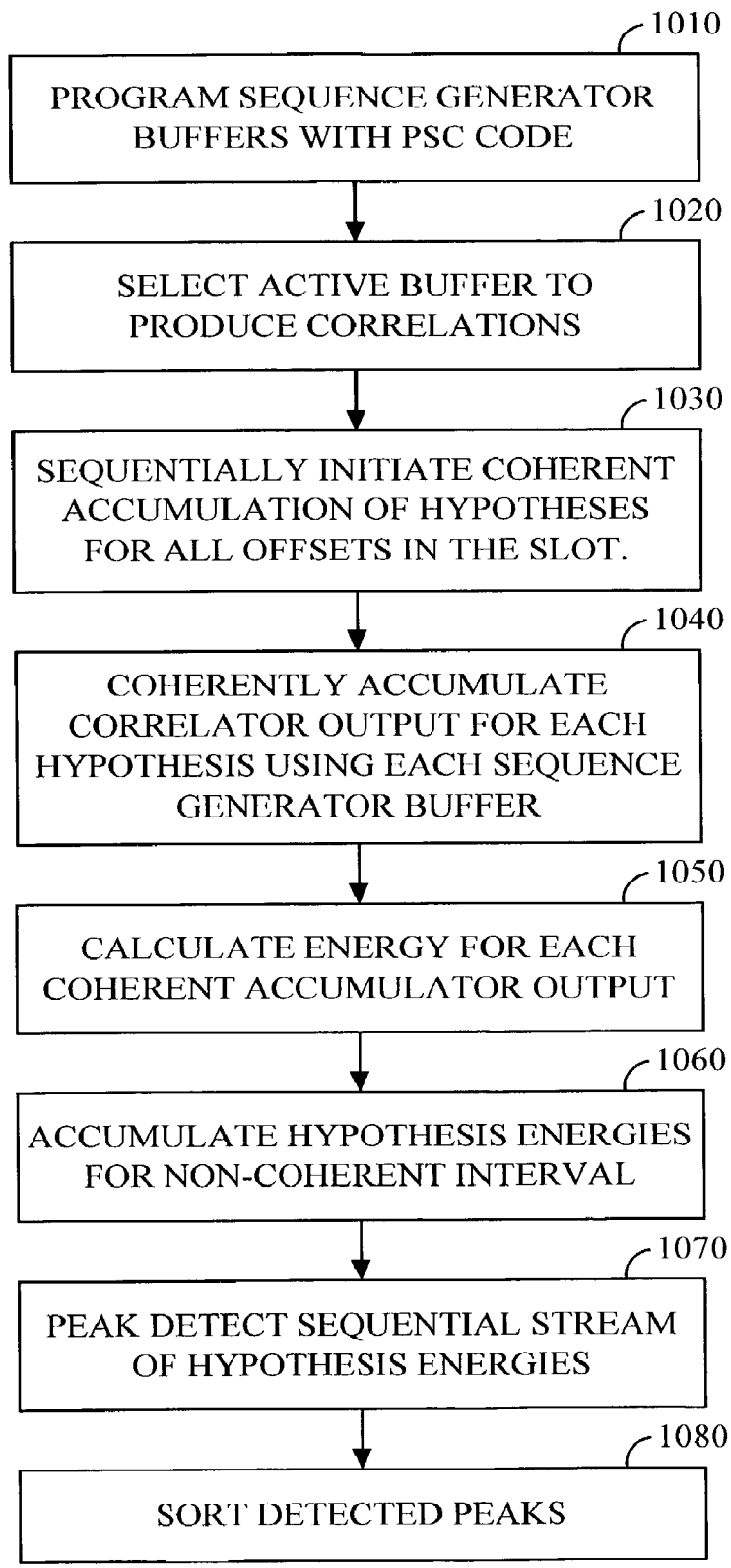
FIG. 10 is a flow chart depicting an embodiment of a step one search method, adaptable for use with various embodiments described herein.

An addressing scheme is needed to perform coherent accumulation of hypotheses for a multi-slice correlator that is producing an output once per cycle. The addressing scheme can be complicated when a double-packing scheme is introduced. If the coherent accumulation of hypotheses is to be completed in sequential order, to achieve the benefits mentioned earlier, there needs to be coordination between the various blocks of search engine 310. The method of FIG. 10 describes one solution to this need. FIG. 10 depicts a method for step one W-CDMA searching which generates an ordered sequence of coherently accumulated PSC hypotheses, from which an ordered sequence of corresponding energy values and non-coherent accumulated energy values can be generated. The ordered sequence can be peak detected and sorted. The most likely offsets to contain the PSC can be searched in a step two search engine. This method has the additional benefit of utilizing a simple addressing scheme for the RAM in the coherent accumulator 440 as well as the RAM in the non-coherent accumulator (described further below).

For clarity, the method of FIG. 10 will be described in terms of the exemplary embodiments of correlator 420, sequence generator 430, and coherent accumulator 440, described above. Furthermore, the exemplary embodiments of non-coherent accumulator 460, peak detector 470, and sorter 480, described in detail below, are well-suited for the exemplary method of FIG. 10. The various steps of the method of FIG. 10 will be described in conjunction with Table 3, below. Those of skill in the art will be able to readily adapt the principles of this method to various deployments of alternate embodiments.

Note that steps 1020 through 1080 repeat concurrently until all the hypotheses' energies are accumulated, peak-detected and sorted.

The process begins in step 1010, where the sequence generator buffers are programmed with sequential portions of the PSC. In exemplary sequence generator 430, buffers 610 through 640 are programmed with PSC chips 0-63, 64-127, 128-191, and 192-255, respectively, as described above with respect to FIG. 6. Proceed to step 1020.

In step 1020, the sequence generator buffers are selected such that the active buffer produces a correlation for a hypothesis, H(s). In the exemplary embodiment, the active buffer is selected according to the method described above in Table 1. Table 3 also shows the timing of the active buffer selection in each cycle. There are eight cycles in each chip. Chips are denoted by the index n. Cycles are denoted by chip×8, incremented from 0 to 7 for each chip n. So, for example, in chip 0, during chip×8 0, the active buffer is set to 0 and a 64-chip accumulation will be produced in correlator 420 for hypothesis H(0). For chip 0, chip×8 4, the active buffer is again set to 0 and correlator 420 will produce a 64-chip accumulation for H(0.5). As described above, the active buffer is selected according to the chip and chip×8 cycle, given by (n div 64−chip×8) mod 4. The active buffer is continuously updated according to this method throughout the step one search procedure.

Step 1030 operates concurrently with step 1020 as the correlator produces partial accumulations for hypotheses. In step 1030, coherent accumulations are initiated sequentially for all the offsets in a slot. During each chip n, coherent accumulation for H(n) and H(n+0.5) will be initiated. In the exemplary embodiment, H(s) for s=0, 0.5, 1, . . . 2559.5 will be tested. The chip×8 cycle in which a new hypothesis is initiated will vary depending on n, as seen in Table 3. During the initial coherent accumulation of a step one search process, the output of correlator 420 and the contents of RAM cells in coherent accumulator 440 will gradually be utilized until the pipeline is full. The details of this will be seen in the following discussion. During successive coherent accumulations, to provide multiple energies for non-coherent accumulation (described more fully below), the pipeline will remain full as the set of hypotheses from the end of a slot finish and the set of hypotheses from the beginning of a new slot begin again.

For example, hypotheses H(0) and H(0.5) will be initiated in chip 0, during chip×8 0 and 4, respectively. Since accumulation is initiated in this cycle, the 64-chip correlator result will not be summed with a partial accumulation value stored in RAM, but will simply be stored in RAM for use in the next coherent accumulation cycle for that hypothesis. As shown, H(0) will be stored in RAM cell 0, which corresponds to RAM address 0. H(0.5) will be stored in RAM cell 4, corresponding to RAM address 2. Note that, during chip 0, the pipeline is only beginning to be filled, and the output of the correlator is not used during chip×8 cycles 1-3 and 5-7. Correspondingly, no additional hypotheses are calculated, and RAM cell addresses 1-3 and 5-7 are not used. RAM addresses 1 and 3 also remain unused. A similar pattern repeats for the next 63 cycles, corresponding to n=1 through n=63, where hypotheses H(1) through H(63.5) are initiated. Three quarters of the chip×8 cycles and corresponding RAM cells are not used. Half of the RAM addresses are unused.

During chip 64, n=64, H(0) and H(0.5) continue to occupy chip×8 0 and 4, respectively. H(64) and H(64.5) will be initiated during chip×8 1 and 5, with the results stored in RAM cells 1 and 5, respectively. The results of H(0) and H(64) will be double-packed and stored in RAM address 0, and the results of H(0.5) and H(64.5) will be similarly stored in RAM address 2. This pattern repeats for the next 63 cycles (n=65 through n=127), where hypotheses H(65) through H(127.5) are initiated. Now only half of the chip×8 cycles and RAM cells remain unused. Due to the double-packing of results, half of the RAM addresses are still unused.

During chip 128, n=128, H(0) and H(0.5) continue to occupy chip×8 0 and 4, respectively. H(64) and H(64.5) continue to occupy chip×8 1 and 5, respectively. H(128) and H(128.5) will be initiated during chip×8 2 and 6, with results stored in RAM cells 2 and 6, respectively. The result of H(128) will be stored in RAM address 1 and H(128.5) will be stored in RAM address 3. Again, this pattern repeats for the next 63 cycles (n=129 through n=191), where hypotheses H(129) through H(191.5) are initiated. Now only one quarter of the chip×8 cycles and RAM cells remain unused. All of the RAM addresses are now used.

During chips 192 through 255, chip×8 3 and 7 are used to initiate H(192) through H(255.5). At the end of chip 255, all the cycles, RAM cells, and RAM addresses are being used, and so the pipeline is full.

Step 1040 proceeds concurrently with step 1030, acting on all the hypotheses that are currently in the pipeline. In step 1040, for each hypothesis in the pipeline, the correlator output is accumulated until each sequence generator buffer is used for that hypothesis. Note that the active buffer sequencing is performed such that the buffers are used sequentially and only once per hypothesis in a given slot. Thus, each hypothesis will have a 64-chip correlator output produced once every 64 chips, for four sequential sets of 64 chips. After that, the coherent accumulation for that hypothesis is completed and the output is delivered for energy calculation in step 1050. When the pipeline is full, 256 hypotheses will be active. Starting with chip 192, a hypothesis will be completed every chip×2 (and, as described in step 1030, a new hypothesis will be initiated in the same chip×2)—thus the pipeline remains full until non-coherent accumulation nears completion, and the pipeline reduces one hypothesis per chip×2 until empty.

For example, H(0) is initiated in chip 0. In chip 64, H(0) is updated by retrieving the contents of RAM cell 0, stored in RAM address 0, summing those contents with the correlator output, and storing the summed results back in the corresponding RAM cell and address. The process is repeated for H(0) in chip 128. The retrieval and summing process is repeated for H(0) in chip 192, but the results are delivered for energy calculation in step 1050. The results do not need to be stored. In some embodiments, zeros can be stored in that location to initialize the memory for the next hypothesis, which will be H(256) in chip 256. Alternatively, in chip 256, the memory location contents can be ignored, or summing suppressed, with the result that the correlator output corresponding to H(256) is stored in RAM cell 0 during chip 256. Various accumulation techniques are known for performing these tasks. Similarly, H(0.5) completes and H(256.5) initiates during the same chip, albeit at a different chip×8. This can be seen in Table 3.

Recall that, as described above, coherent accumulation will be performed four times for each hypothesis in a slot (5,120 offsets per slot corresponding to half-chip testing for each of 2,560 chips). For non-coherent accumulation intervals greater than one, the coherent accumulation procedure just described repeats according to the interval. Thus the pipeline remains full except at the beginning of the first coherent accumulation and at the end of the last. The dashed portions of Table 3 will therefore correspond to the final hypotheses of the previous slot during chips 0 through 191 after the initial coherent accumulation takes place. Those of skill in the art will recognize how to apply these steps appropriately.

Note that, as desired, the hypothesis outputs generated in step 1040 are sequential. That is, the first completed accumulation will be H(0), then H(0.5), etc. until H(2559.5) is completed and output. During successive slots, H(2559.5) of one slot will be followed by H(0) of the next.

Address generation for accessing the coherent RAM, such as RAM 940, can be performed in a RAM control block such as RAM control 930. It can be seen in Table 3 that the RAM address increments by one, modulo 256, every other chip×8 cycle. This can be implemented with a simple 8-bit upcounter. Furthermore, each address can be written to in one cycle and read from in another without updating since the address remains constant for two cycles. Those of skill in the art will recognize how to buffer the results for double-packed reads and writes, with the appropriate delay elements required to use the upcounter for address generation. The details are not shown.

TABLE 3

| Chip (n) | chip×8 | Active Buffer | Hypothesis H(s) | RAM Cell Adress | RAM Address |
|---|---|---|---|---|---|
| 0 | 0 | 0 | H(0) | 0 | 0 |
|   | 1 | 3 | — | — |   |
|   | 2 | 2 | — | — | 1 |
|   | 3 | 1 | — | — |   |
|   | 4 | 0 | H(0.5) | 4 | 2 |
|   | 5 | 3 | — | — |   |
|   | 6 | 2 | — | — | 3 |
|   | 7 | 1 | — | — |   |
| 1 | 0 | 0 | H(1) | 8 | 4 |
|   | 1 | 3 | — | — |   |
|   | 2 | 2 | — | — | 5 |
|   | 3 | 1 | — | — |   |
|   | 4 | 0 | H(1.5) | 12 | 6 |
|   | 5 | 3 | — | — |   |
|   | 6 | 2 | — | — | 7 |
|   | 7 | 1 | — | — |   |
| ... | ... | ... | ... | ... | ... |
| 63 | 0 | 0 | H(63) | 504 | 252 |
|   | 1 | 3 | — | — |   |
|   | 2 | 2 | — | — | 253 |
|   | 3 | 1 | — | — |   |
|   | 4 | 0 | H(63.5) | 508 | 254 |
|   | 5 | 3 | — | — |   |
|   | 6 | 2 | — | — | 255 |
|   | 7 | 1 | — | — |   |
| 64 | 0 | 1 | H(0) | 0 | 0 |
|   | 1 | 0 | H(64) | 1 |   |
|   | 2 | 3 | — | — | 1 |
|   | 3 | 2 | — | — |   |
|   | 4 | 1 | H(0.5) | 4 | 2 |
|   | 5 | 0 | H(64.5) | 5 |   |
|   | 6 | 3 | — | — | 3 |
|   | 7 | 2 | — | — |   |
| 65 | 0 | 1 | H(1) | 8 | 4 |
|   | 1 | 0 | H(65) | 9 |   |
|   | 2 | 3 | — | — | 5 |
|   | 3 | 2 | — | — |   |
|   | 4 | 1 | H(1.5) | 12 | 6 |
|   | 5 | 0 | H(65.5) | 13 |   |
|   | 6 | 3 | — | — | 7 |
|   | 7 | 2 | — | — |   |
| ... | ... | ... | ... | ... | ... |
| 127 | 0 | 1 | H(63) | 504 | 252 |
|   | 1 | 0 | H(127) | 505 |   |
|   | 2 | 3 | — | — | 253 |
|   | 3 | 2 | — | — |   |
|   | 4 | 1 | H(63.5) | 508 | 254 |
|   | 5 | 0 | H(127.5) | 509 |   |
|   | 6 | 3 | — | — | 255 |

TABLE 3-continued

| Chip (n) | chipx8 | Active Buffer | Hypothesis H(s) | RAM Cell Adress | RAM Address |
|---|---|---|---|---|---|
| | 7 | 2 | — | — | |
| 128 | 0 | 2 | H(0) | 0 | 0 |
| | 1 | 1 | H(64) | 1 | |
| | 2 | 0 | H(128) | 2 | 1 |
| | 3 | 3 | — | — | |
| | 4 | 2 | H(0.5) | 4 | 2 |
| | 5 | 1 | H(64.5) | 5 | |
| | 6 | 0 | H(128.5) | 6 | 3 |
| | 7 | 3 | — | — | |
| 129 | 0 | 2 | H(1) | 8 | 4 |
| | 1 | 1 | H(65) | 9 | |
| | 2 | 0 | H(129) | 10 | 5 |
| | 3 | 3 | — | — | |
| | 4 | 2 | H(1.5) | 12 | 6 |
| | 5 | 1 | H(65.5) | 13 | |
| | 6 | 0 | H(129.5) | 14 | 7 |
| | 7 | 3 | — | — | |
| ... | ... | ... | ... | ... | ... |
| 191 | 0 | 2 | H(63) | 504 | 252 |
| | 1 | 1 | H(127) | 505 | |
| | 2 | 0 | H(191) | 506 | 253 |
| | 3 | 3 | — | — | |
| | 4 | 2 | H(63.5) | 508 | 254 |
| | 5 | 1 | H(127.5) | 509 | |
| | 6 | 0 | H(191.5) | 510 | 255 |
| | 7 | 3 | — | — | |
| 192 | 0 | 3 | H(0) | 0 (H(0) Done) | 0 |
| | 1 | 2 | H(64) | 1 | |
| | 2 | 1 | H(128) | 2 | 1 |
| | 3 | 0 | H(192) | 3 | |
| | 4 | 3 | H(0.5) | 4 (H(0.5) Done) | 2 |
| | 5 | 2 | H(64.5) | 5 | |
| | 6 | 1 | H(128.5) | 6 | 3 |
| | 7 | 0 | H(192.5) | 7 | |
| 193 | 0 | 3 | H(1) | 8 (H(1) Done) | 4 |
| | 1 | 2 | H(65) | 9 | |
| | 2 | 1 | H(129) | 10 | 5 |
| | 3 | 0 | H(193) | 11 | |
| | 4 | 3 | H(1.5) | 12 (H(1.5) Done) | 6 |
| | 5 | 2 | H(65.5) | 13 | |
| | 6 | 1 | H(129.5) | 14 | 7 |
| | 7 | 0 | H(193.5) | 15 | |
| ... | ... | ... | ... | ... | ... |
| 255 | 0 | 3 | H(63) | 504 (H(63) Done) | 252 |
| | 1 | 2 | H(127) | 505 | |
| | 2 | 1 | H(191) | 506 | 253 |
| | 3 | 0 | H(255) | 507 | |
| | 4 | 3 | H(63.5) | 508 (H(63.5) Done) | 254 |
| | 5 | 2 | H(127.5) | 509 | |
| | 6 | 1 | H(191.5) | 510 | 255 |
| | 7 | 0 | H(255.5) | 511 | |
| 256 | 0 | 0 | H(256) | 0 | 0 |
| | 1 | 3 | H(64) | 1 (H(64) Done) | |
| | 2 | 2 | H(128) | 2 | 1 |
| | 3 | 1 | H(192) | 3 | |
| | 4 | 0 | H(256.5) | 4 | 2 |
| | 5 | 3 | H(64.5) | 5 (H(64.5) Done) | |
| | 6 | 2 | H(128.5) | 6 | 3 |
| | 7 | 1 | H(192.5) | 7 | |
| 257 | 0 | 0 | H(257) | 8 | 4 |
| | 1 | 3 | H(65) | 9 (H(65) Done) | |
| | 2 | 2 | H(129) | 10 | 5 |
| | 3 | 1 | H(193) | 11 | |
| | 4 | 0 | H(257.5) | 12 | 6 |
| | 5 | 3 | H(65.5) | 13 H(65.5) Done) | |
| | 6 | 2 | H(129.5) | 14 | 7 |
| | 7 | 1 | H(193.5) | 15 | |
| ... | ... | ... | ... | ... | ... |
| 319 | 0 | 0 | H(319) | 504 | 252 |
| | 1 | 3 | H(127) | 505 H(127) Done) | |
| | 2 | 2 | H(191) | 506 | 253 |
| | 3 | 1 | H(255) | 507 | |
| | 4 | 0 | H(319.5) | 508 | 254 |
| | 5 | 3 | H(127.5) | 509 (H(127.5) Done) | |
| | 6 | 2 | H(191.5) | 510 | 255 |
| | 7 | 1 | H(255.5) | 511 | |
| ... | ... | ... | ... | ... | ... |

Returning to FIG. 10, the coherent accumulation results generated in step 1040 are delivered for energy calculation in step 1050. Step 1050 operates concurrently with step 1040, as each hypothesis result is generated. The coherent accumulation for each hypothesis contains an I and a Q value. The energy can be calculated as $I^2+Q^2$. Since the input operated on in step 1050 is sequential, H(0) through H(2559.5), the output energies are also generated sequentially for processing in step 1060.

In step 1060, the energies corresponding to the PSC hypotheses calculated in step 1050 are accumulated for a non-coherent accumulation interval. Referring to Equation 1, above, the non-coherent interval, M, should be chosen depending on the desired probability of detection and probability of false alarm, the $E_c/I_o$ of the PSC, and other factors. An exemplary embodiment of a non-coherent accumulator 460 will be detailed with respect to FIG. 11, below. In this embodiment, the accumulator RAM is sized large enough to store partial non-coherent accumulation for all 5,120 hypotheses. This allows for the calculation of one coherent accumulation for each hypothesis every slot, and the non-coherent search time is then M, the non-coherent accumulation interval, times the slot duration. The non-coherent accumulation completes in sequence for the PSC hypotheses, as described above, and the resultant accumulated energy values can be delivered for peak detection in step 1070. Alternate embodiments can trade off search time for memory size. For example, a RAM of half the size would require twice the search time to test all the hypotheses. Various RAM size/search time embodiments will be readily apparent to those of skill in the art and fall within the scope of the present invention. Note that, even with alternate embodiments, the energy values can be produced sequentially for peak detection in step 1070.

In step 1070, the sequential stream of non-coherently accumulated energies corresponding to the PSC hypotheses are peak detected. An exemplary peak detector 470 is detailed with respect to FIG. 12, below. In one embodiment, peaks are detected by locating energy values with a lower energy value before it in time and a lower or equal energy value after it in time. If the peak exceeds a certain threshold, it is a valid peak and is delivered for sorting in step 1080.

In step 1080, the valid peaks are sorted using one of various sorting techniques known in the art. Any sorting technique can be used within the scope of the present invention. An exemplary embodiment of a sorter 480 is detailed below with respect to FIG. 13. The sorted peaks indicate offsets likely to contain the PSC, and these peaks can be delivered for use in step two searching, as described above.

Figure 11:
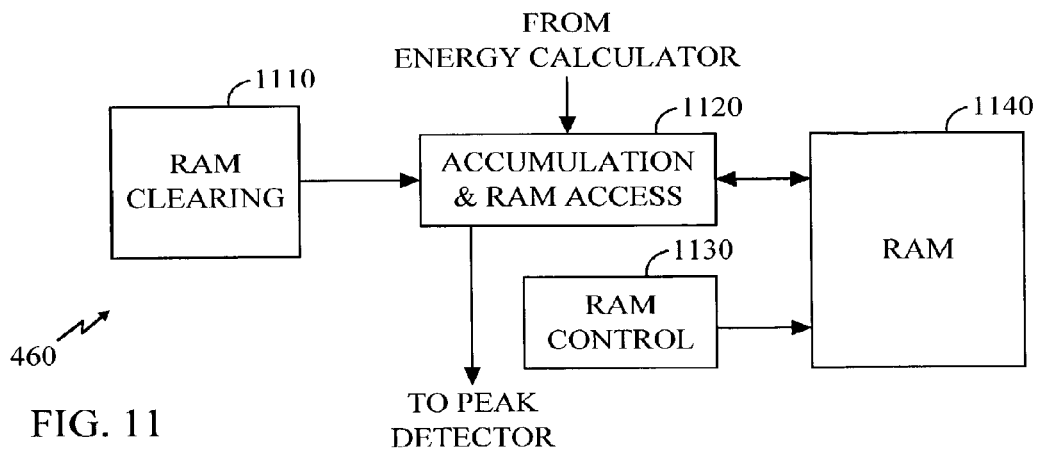
FIG. 11 depicts an embodiment of a non-coherent accumulator.

FIG. 11 depicts an exemplary embodiment of non-coherent accumulator 460. The structure of non-coherent accumulator 460 can be quite similar to coherent accumulator 440. Energy values from energy calculator 450 are delivered to accumulation and RAM access block 1120. When an accumulation is beginning, as controlled by RAM clearing block 1110, the energy value is stored in the RAM 1140 in a location corresponding to the hypothesis being non-coherently accumulated. A variety of techniques for accumulation initialization are known, examples of which are discussed above in reference to the coherent accumulator 440 of FIG. 9. When an accumulation is in progress, the partial accumulation value is retrieved from RAM 1140, added to the incoming energy value, and the result is stored in RAM 1140. The address and access control for RAM 1140 is provided by RAM control 1130. When a non-coherent accumulation is complete for a hypothesis, that is, when the non-coherent accumulation interval has elapsed, the accumulated energy value is delivered to peak detector 470. In an alternate embodiment, the accumulated energy value may be made available for further processing in a device such as a DSP.

As with the coherent accumulator 440, the peak throughput requirement of non-coherent accumulator 460 is one read and one write every chip×8 cycle. Double-packing of RAM 1140 is used to meet this requirement, as discussed above in relation to coherent accumulator 440. Note that, in general, the coherent accumulation boundary can be different for various search windows, so the arrival of new energy values for various hypotheses can be intermittent. Therefore, there may be times where one of the two words accessed in a read cycle can be ignored, or one of the double-packed words is not updated, so the original value is simply written back unchanged.

In the exemplary embodiment, RAM 1140 is sized such that a partial accumulation can be stored for all the step one search hypotheses in a slot, i.e. H(0) through H(2559.5). Table 4 shows how the various hypotheses are double packed and stored for step one searching. The addresses range from 0 to 2559, with two hypotheses stored per address. Recall that coherent RAM 940 only needed to be 256 addresses deep to hold 512 partial coherent accumulations. This is due to the fact that the PSC is only transmitted during 256 out of the 2,560 chips in a slot. Thus, storage for a hypothesis only needs to be maintained for $\frac{1}{10}^{th}$ of a slot. The address locations can therefore be reused within a slot, each address at different times holding a partial accumulation for 10 different hypotheses. In contrast, for non-coherent accumulation, all of the actively tested hypotheses must be stored in RAM 1140, slot after slot, until the non-coherent interval is reached. Therefore, to maximize search speed, the exemplary embodiment deploys enough RAM to maintain all the hypotheses, each of which will be updated once per slot until complete. The non-coherent RAM 1140, in this embodiment, is 10 times the size of coherent RAM 940. As discussed above in step 1060 of FIG. 10, alternate embodiments can trade off reduced RAM 1140 size for increased search time. For example, if the RAM size is halved, the search time is doubled due to the fact that only half of the hypotheses can be stored at one time.

TABLE 4

|  |  | MSB | LSB |
|---|---|---|---|
| Address | 0 | H(0.5) | H(0) |
|  | 1 | H(1.5) | H(1) |
|  | 2 | H(2.5) | H(2) |
|  | 3 | H(3.5) | H(3) |
|  | ... | ... | ... |
|  | 2559 | H(2559.5) | H(2559) |

In addition to providing the results of non-coherent accumulation after the non-coherent accumulation interval, it may be desirable to deliver intermediate accumulation results to peak detector 470. This so called early dump procedure allows the peak detector to identify peaks which exceed a threshold prior to completion of non-coherent accumulation. Step two W-CDMA searching can be time consuming, and may be the search-time bottleneck. In some cases, identifying peaks early and sending them for step two searching allows step one and step two searching to proceed simultaneously. If this capability is deployed in an embodiment, the intermediate non-coherent accumulation results are not zeroed out by RAM clearing block 1110 when they are delivered early, but are retained for the completion of the non-coherent accumulation interval. This feature can be used for any of the searcher modes. Those of skill in the art will recognize how to implement such an embodiment, and the details are omitted in FIG. 11.

Note that address generation, as carried out in RAM control 1130, can be carried out simply during step one search by using an upcounter, as described above in relation to RAM control 930. However, for step one search, using the memory mapping as shown in Table 4, the upcounter should count sequentially, once per chip, modulo 2,560. Recall that for step 3 searching, or multimode searching, the sequences being searched are present during the entire slot, as opposed to the PSC which is only transmitted in the first 256 chips. Therefore there only needs to be a 1:1 ratio between non-coherent RAM addresses and coherent RAM addresses, rather than the 10:1 ratio maintained for step one. Thus, for step three and multimode searching, only the first 256 addresses of RAM 1140 need to be used, and the addressing can be done using an 8-bit upcounter similar to the one describes above for coherent accumulator 440. When not in step one, the outputs of the correlator correspond to the slice allocation described in FIG. 8. Therefore, the memory locations for coherent and non-coherent RAMs can be allocated as shown in Table 5.

TABLE 5

|  |  | MSB | LSB |
|---|---|---|---|
| Address | 0 | Slice 1 | Slice 0 |
|  | 1 | Slice 3 | Slice 2 |
|  | 2 | Slice 1 | Slice 0 |
|  | 3 | Slice 3 | Slice 2 |
|  | ... | ... | ... |
|  | 255 | Slice 3 | Slice 2 |

Figure 12:
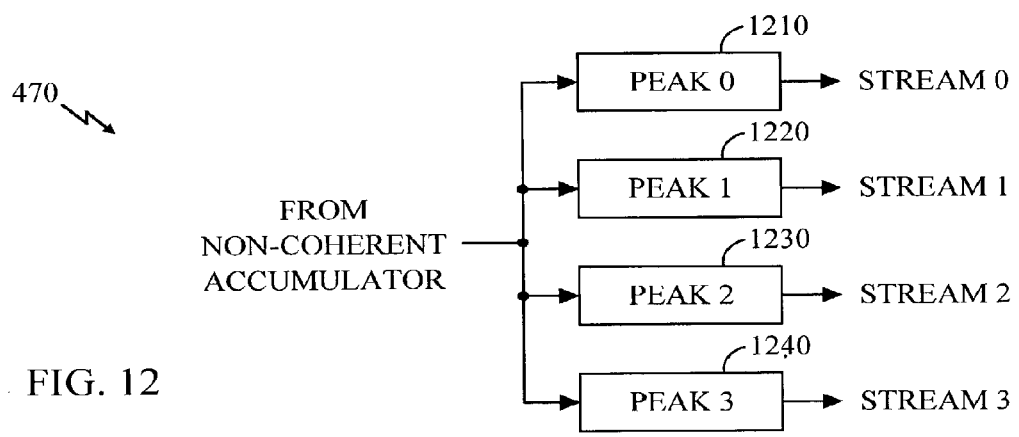
FIG. 12 depicts a peak detector adaptable for producing one or a plurality of peak streams.

FIG. 12 depicts an embodiment of peak detector 470. It comprises a plurality of peak detection subcomponents, Peak 0 1210, Peak 1 1220, Peak 2 1230, and Peak 3 1240. The peak detection subcomponents operate on energy values delivered from the non-coherent accumulator. (In an alternate embodiment, the peak detection subcomponents can operate on values delivered from another source, such as a DSP.) Each peak detection subcomponent is capable of detecting peaks independently from one another. The detected peaks are output on the signals stream 0, stream 1, stream 2, and stream 3, respectively. The output streams in the exemplary embodiment are delivered to sorter 480. Alternate embodiments may deliver the output streams to another component, such as a DSP. The exemplary embodiment shown in FIG. 12 comprises four peak detection subcomponents, which can support independent peak detection for up to four different sets of incoming energies. Naturally, alternate embodiments of peak detector 470 can deploy any number of peak detection subcomponents.

For step three or multimode searching, the four peak detection subcomponents can be conveniently assigned to operate on the energy values corresponding to values generated by the four slices of the multi-slice correlator 420. It is not necessary to operate all of the four peak detection subcomponents. For example, two or more correlator slices can be configured to produce energy values from a continuous segment of hypotheses, such that a single peak detection subcomponent detects the peaks for all of the correlator slices. This feature is useful for all search modes, including step three and multimode searching, but is particularly convenient for step one searching, such as in step 1070 of the method described above in relation to FIG. 10. Recall that one of the benefits of that method is to produce a sequential stream of all the hypotheses of PSC offsets, so only one peak detector will be employed.

Peak detection techniques are known in the art, and any such technique can be employed in peak detection subcomponents 1210-1240. In the exemplary embodiment, the peak detection subcomponents 1210-1240 can operate in one of two modes. In normal mode, peaks meeting a threshold requirement are detected in the incoming energy stream. Peaks below the threshold are marked as invalid, and those above are marked as valid. A peak is defined as an energy value that has a lower value before it in time and a lower or equal value after it in time. Valid peaks are sent to the sorter.

In bypass more, a valid/invalid decision is made depending on whether the threshold requirement is made. However, peak detection is not performed. All energy values marked as valid are sent to the sorter. The sorter can then be used to sort the valid energy values.

In either mode, the information sent to the sorter comprises the energy value, the offset corresponding to the hypothesis, and a bit to denote whether it is valid or invalid.

Figure 13:
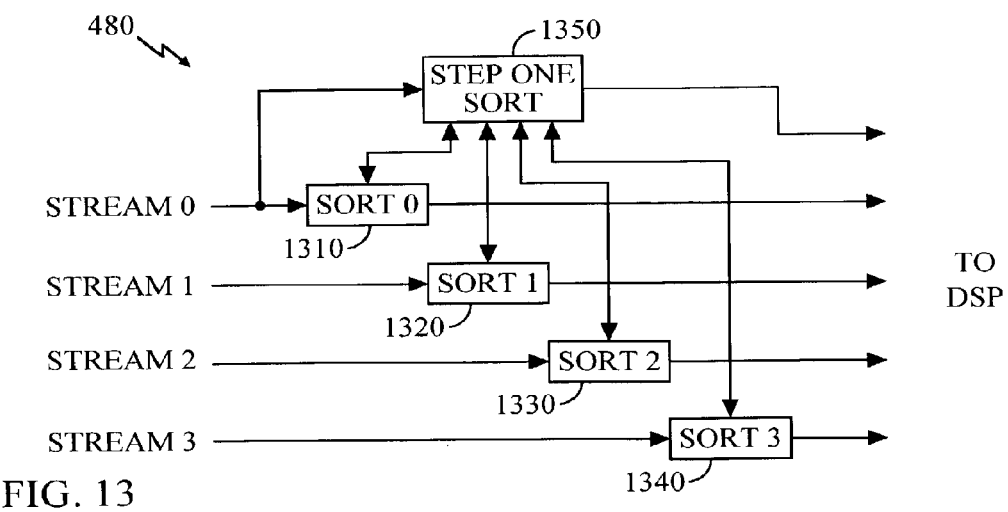
FIG. 13 depicts an embodiment of a sorter configurable for sorting a plurality of peak streams or a single peak stream.

FIG. 13 depicts an exemplary embodiment of sorter 480. Sorter 480 comprises four independent sorting components sort 0 through sort 3, 1310-1340 respectively, and an additional sorting component, step one sort 1350. In step three or multimode sorting, sort 0 through sort 3, 1310-1340, receive and sort streams 0 through 3 respectively. In step one sorting, all the sorting components 1310-1350 are configured as one larger sorter, for receiving and sorting a single stream, stream 0 in the exemplary embodiment. Alternate embodiments can be deployed comprising any number of sorting components. In the exemplary embodiment, each sorting component 1310-1340 is a 7-bin sorter, using a binary sort algorithm. Step one sort 1350 contains three additional bins, and, when configured for step one sorting, sorting components 1310-1340 are reused and combined with sorting component 1350 to produce one 31-bin sorter. The results stored in all the sorting bins are accessible by the DSP, or other hardware configured to receive the sorted peaks. This configuration is exemplary only, and any number of bins per sorter, as well as any sorting procedure can be employed.

FIG. 14 depicts an embodiment of a 7-bin sorter suitable for deployment as a sorting element 1310-1340. The intermediate results are stored in registers R0 through R6, 1400-1460 respectively. When the sort procedure is finished, those registers will contain the results. During the sort process, and at its termination, the results are stored in descending order in R0 through R6. As shown in FIG. 14, R0≧R1≧R2≧R3≧R4≧R5≧R6.

The dashed lines between the registers R0 through R6 represent the results of comparison during the sort procedure. When a new peak arrives in sorter 480, referred to as a candidate for the remainder of this discussion, it is compared first with the contents of register R3 1430. If the candidate is greater than R3, the next comparison is done with the contents of register R1, 1410. If the candidate is less than or equal to R3, the next comparison is with the contents of register R5, 1450. The tree structure is followed with subsequent comparisons. If the candidate is greater than R1, it is compared with the contents of R0 1400. This is a leaf in the tree, and is one termination of the sort procedure. If the candidate is greater than R0, then R0 is replaced with the candidate, and the contents of R1 through R6 receive the previous values of R0 through R5. If the candidate is less than or equal to R0, then the candidate is stored in R1, and the contents of R2 through R6 receive the previous values stored in R1 through R5. R0 will remain unchanged, since it is greater than both R1 and the candidate. If the candidate is less than or equal to R1, then it is compared with the contents of register R2 1420. Similarly, if the candidate is greater than R2 it takes the place of R2. If less than or equal to R2, the candidate is stored in R3, and R4 through R6 receive the previous values of R3 through R5. In other words, the candidate is compared with values along the tree until a leaf node is reached, where one location (if any) for the candidate is identified. The values lower than the candidate are then shifted down through the remaining registers, and the lowest value previously stored in R6 is discarded (unless the candidate is less than R6, in which case the candidate is discarded). The process follows this pattern throughout the tree. FIG. 15, in conjunction with Table 6, described below, outlines this process in greater detail.

Returning to FIG. 14, control block 1470 receives the contents of registers R0 through R6, 1400-1460, respectively. Control block 1470 also communicates with comparator 1480. In this embodiment, the candidate enters by the signal labeled input. Input is connected to the "a" input of comparator 1480. The "b" input of comparator 1480 is supplied by control block 1470. Comprator 1480 returns a signal, a>b, which is asserted when a is greater than b and de-asserted when a is less than or equal to b. Control block 1470 controls the "b" input to comparator 1480 In conjunction with the comparator output, an internal state value, and the R0 through R6 values, control block 1470 produces the next values to be stored in R0 through R6, R0' through R6', respectively.

Figure 17:
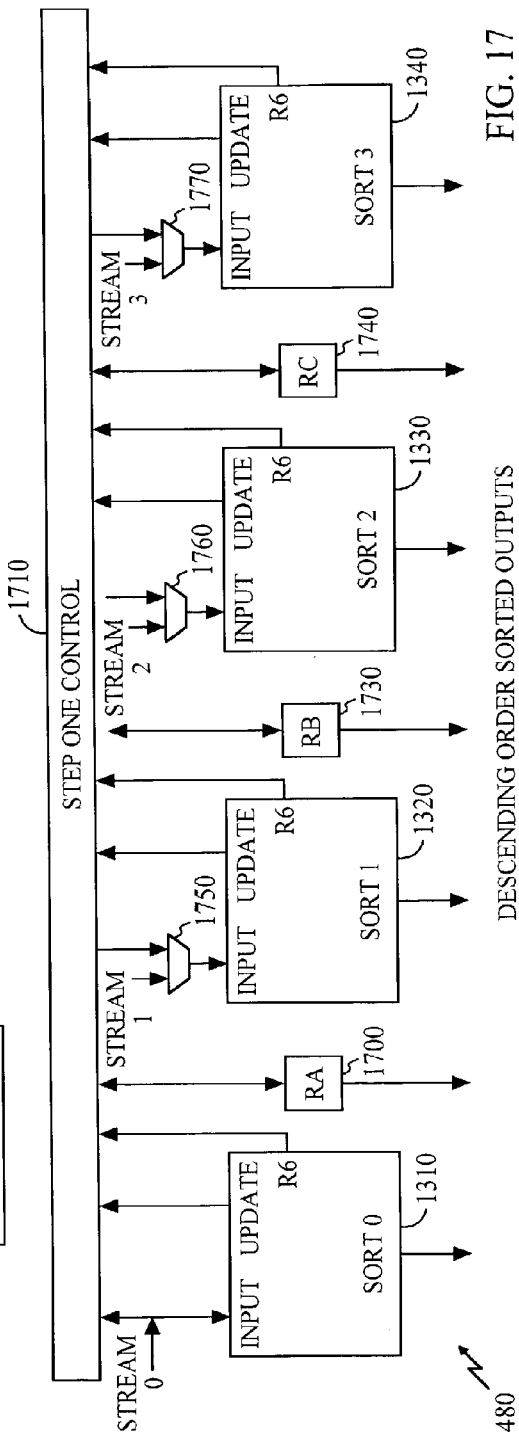
FIG. 17 depicts a 31-bin sorter comprising four 7-bin sorters.

A signal labeled update is generated for use when the 7-bin sorter is combined in a hierarchical structure to form a larger sorter, an example of which is detailed with respect to FIG. 17 below. The update signal is asserted when one or more of the registers R0 through R6 is changed, meaning the candidate input was inserted into one of the bins. When the input is less than all the registers R0 through R6, the update signal will not be asserted. The contents of R6 are also shown as an output, useful for the hierarchical structure just mentioned. When update is asserted, meaning that the input was stored in one of the registers R0 through R6, the old value of R6 may be needed to shift into another part of a larger sort structure. The contents of R0 through R6, after sorting is complete, will contain the sorted results. Naturally these values are available for further processing. In the exemplary embodiment, R0 through R6 are accessed by DSP 240.

FIG. 15 depicts a state diagram useful for deployment in an embodiment of a 7-bin sorter 1310-1340. Throughout the procedure, the value "a" is assigned the input value; that is, the energy value of the incoming peak candidate. The process remains in state S3 1530 while the input is not a valid peak. In state S3, the "b" value is set to the contents of register R3. When a valid peak arrives, the peak (a=input) is compared with R3 (b=R3). If a>b, proceed to state S1 1510. If not, then a≦b, proceed to state S5 1550. In state S1 1510, b is set to the contents of register R1. In state S1, if a>b, that is the input is greater than R1, proceed to state S0 1500. In state S1, if a≦b, proceed to state S2 1520. In state 1550, the "b" value is set to the contents of register R5. In state S5, if a>b, proceed to state S4 1540. In state S5, if a≦b, proceed to state S6 1560. In states S0, S2, S4 and S6, b is set to R0, R2, R4, or R6, respectively. The final updating of the registers and completion of the sort procedure is dependent on the final comparison and the state from which the final comparison is made. These details are contained in Table 6 below. After any of these states S0, S2, S4, or S6, update the registers and produce the update output as shown in Table 6 and return to state S3 1530 to await any subsequent peak candidates. Note that the sorting procedure requires only one comparator which is used once per cycle each of three cycles. Those of skill in the art will recognize how to expand this process using additional registers and additional cycles (but still only one comparator) to create various other sorting bin sizes for deployment as sorter 480, or as any of sub-sorting components thereof.

Figure 16:
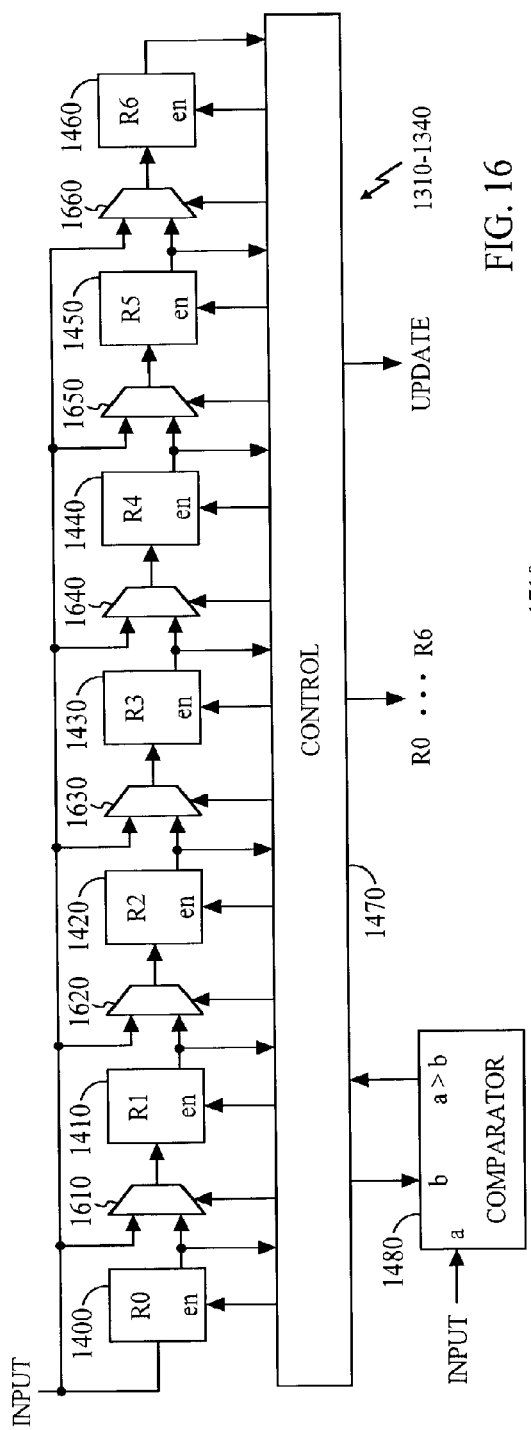
FIG. 16 depicts an alternate embodiment of a 7-bin sorter.

Table 6 details how a control block such as control block 1470, in conjunction with a comparator output, can produce the next values for registers R0-R6, R0'-R6', respectively, and the value of the update signal. Note that update is asserted whenever input is inserted into one of the sort bins (i.e. one of registers R0 through R6). When update is not asserted, R0' through R6' receive R0 through R6, respectively, and the registers are unchanged. Whenever the input is inserted into a bin, the bins containing larger values are unchanged, while the values less than the input are shifted into the lower bins, with the least of them being discarded (or passed to another block, as described below).

the same function as well. The embodiment of FIG. 16 shows one way to implement the bin updating using enabled registers 1400-1460 to store register contents R0 through R6, respectively. The registers are deployed to receive the input as the next value, receive the left register's contents as the next value, or remain unchanged if the enable signal is not asserted. The selection of the next value for registers 1410-1460 is accomplished by control block 1470 controlling the select signals on muxes 1610-1660, respectively. Note that the R0 register 1400 doesn't need a mux on its input since it is always updated with the input when it is not retaining its previous value. When the input is to be placed in a bin, i.e. one of registers R0 through R6, the enable for that bin is asserted, and the corresponding mux selects the input for loading into the register. Any registers to the left will have their enables de-asserted, since their contents will remain unchanged. Registers to the right will have their enables asserted, and the corresponding muxes will select the contents of the register to the left, thus forming a shift register with the bins to the right of the bin in which the input is loaded. Note that all the sorting bin updates are controlled with register enable signals and

TABLE 6

|  | S0 | | S2 | | S4 | | S6 | |
| --- | --- | --- | --- | --- | --- | --- | --- | --- |
|  | a > b input > R0 | a ≦ b input ≦ R0 | a > b input > R2 | a ≦ b input ≦ R2 | a > b input > R4 | a ≦ b input ≦ R4 | a > b input > R6 | a ≦ b input ≦ R6 |
| R0' | Input | R0 | R0 | R0 | R0 | R0 | R0 | R0 |
| R1' | R0 | input | R1 | R1 | R1 | R1 | R1 | R1 |
| R2' | R1 | R1 | input | R2 | R2 | R2 | R2 | R2 |
| R3' | R2 | R2 | R2 | input | R3 | R3 | R3 | R3 |
| R4' | R3 | R3 | R3 | R3 | input | R4 | R4 | R4 |
| R5' | R4 | R4 | R4 | R4 | R4 | Input | R5 | R5 |
| R6' | R5 | R5 | R5 | R5 | R5 | R5 | input | R6 |
| Update | 1 | 1 | 1 | 1 | 1 | 1 | 1 | 0 |

Table 7 shows the various operations for updating registers R0 through R6 and the conditions under which these operations take place. Note that the conditions for the operations of leaving the registers unchanged are not delineated in Table 7. Those of skill in the art will recognize that the operations and conditions depicted in Table 7 are just one embodiment of the myriad contemplated embodiments.

TABLE 7

| Operation | Conditions |
| --- | --- |
| R0' ← input | S0 AND (a > b) |
| R1' ← R0 | S0 AND (a > b) |
| R1' ← input | S0 AND (NOT a > b) |
| R2' ← R1 | S0 |
| R2' ← input | S2 AND (a > b) |
| R3' ← R2 | S0, S2 AND (a > b) |
| R3' ← input | S2 AND (NOT a > b) |
| R4' ← R3 | S0, S2 |
| R4' ← input | S4 AND (a > b) |
| R5' ← R4 | S0, S2, S4 AND (a > b) |
| R5' ← input | S4 AND (NOT a > b) |
| R6' ← R5 | S0, S2, S4 |
| R6' ← input | S6 AND (a > b) |

FIG. 16 depicts an alternate embodiment of a 7-bin sorter such as 1310-1340. Just as in FIG. 14, control block 1470, receives the R0-R6 values and controls the updating of these registers. Comparator 1480 is used to determine the state transitions and the register updates, if any. R0-R6 are available as outputs for use by a DSP, such as DSP 240, or within a larger hierarchical sorting bin. The update signal performs mux select signals. Table 8 gives exemplary Boolean equations for each of the signals required. Note that R1_sel through R6_sel control muxes 1610 through 1660, respectively. R0_en through R6_en control the enable on R0 through R6 1400-1460, respectively.

TABLE 8

| Select Input for R | Enable R |
| --- | --- |
| N/A for R0 | R0_en = S0 AND a > b |
| R1_sel = S0 AND NOT a > b | R1_en = S0 |
| R2_sel = S2 AND a > b | R2_en = S0 OR (S2 AND a > b) |
| R3_sel = S2 AND NOT a > b | R3_en = S0 OR S2 |
| R4_sel = S4 AND a > b | R4_en = S0 OR S2 OR (S4 AND a > b) |
| R5_sel = S4 AND NOT a > b | R5_en = S0 OR S2 OR S4 |
| R6_sel = S6 | R6_en = S0 OR S2 OR S4 OR (S6 AND a > b) |

To produce a single 31-bin sorter, the principles just described can be used to determine the appropriate state and control to create such a sorter. With additional glue logic, the registers and comparators, and some of the state control logic can be reused to minimize the circuit area expense. In the exemplary embodiment, sorters 1310 through 1340 are deployed as described with respect to FIG. 14 or FIG. 16 above. FIG. 17 depicts the configuration of the four 7-bin sorters 1310-1340, labeled Sort 0 through 3, as well as additional registers and control for producing a 31-bin sort. Thus, FIG. 17 also depicts an alternative embodiment of sorter 480. Sorts 0 through 3 can operate independently on streams 0 through 3, respectively. In the alternative, step one control 1710, registers RA-RC, 1720-1740, respectively and Sorts 0-3, can be configured for 31-bin sorting. Muxes 1750-1770 switch the input to Sorts 1-3, respectively, from independent input to 31-bin sorting input. Note that a mux is not required for Sort 0 since stream 0 is used in this embodiment for 31-bin sorting as well as 7-bin sorting within Sort 0. Step one control 1710 receives an update signal from each 7-bin sorter, as well as the R6 value from each (as described above). Step one control 1710 controls the input for each 7-bin sorter 1310-1340 when sorter 480 is configured for 31-bin sorting. Step one control 1710 also receives the output of and provides the input to registers RA 1720, RB 1730, and RC 1740. These three registers are the additional three bins needed for 31-bin sorting, since each of the four Sorts 0 through 3 contain 7 bins, or 28 bins among them. The outputs of all the bins are available for further processing, such as in DSP 240. The sort results are in descending order from R0-R6 of Sort 0, RA, R0-R6 of Sort 1, RB, R0-R6 of Sort 2, RC, to R0-R6 of Sort 3. Note that a comparator will be used for 31-bin sorting as well. However, a new comparator need not be deployed, since one of the comparators 1480 contained in Sorts 0-3 can be reused. The details are not shown in FIG. 17.

Figure 18:
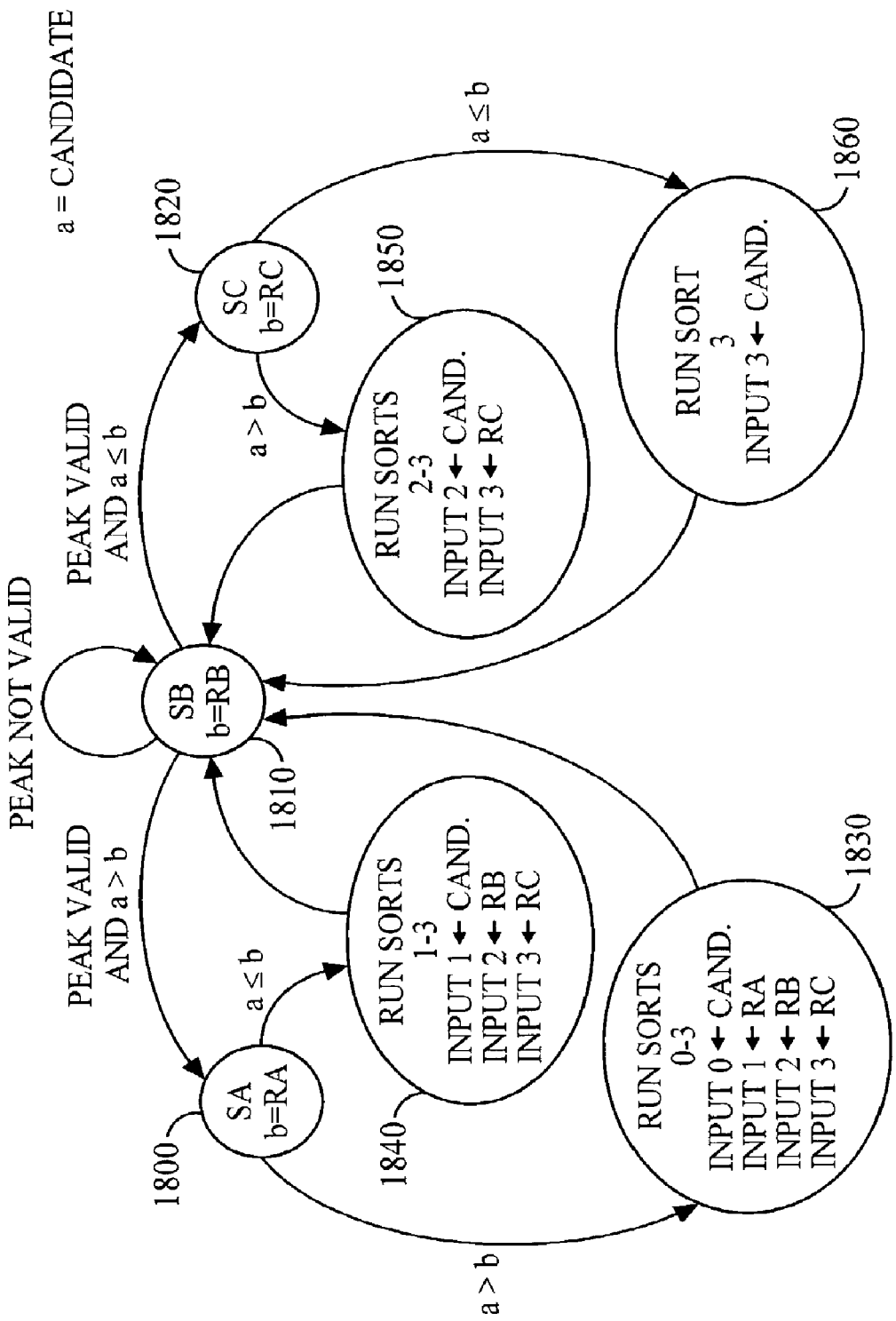
FIG. 18 is a state diagram depicting control for a 31-bin sorter such as that shown in FIG. 18.

FIG. 18 is a state diagram suitable for deployment in an embodiment of step one control 1710. The steps shown in this diagram assume that the sorter is configured for 31-bin sorting. The process remains in state SB 1810 until a valid peak candidate arrives on stream 0. This input is labeled "candidate", and the "a" input to the comparator is assigned the candidate energy value. The "b" input to the comparator is set to the contents of register RB. When a valid peak arrives, and a>b (i.e. candidate is greater than RB), proceed to state SA 1800. Set b=RA. If a>b, proceed to state 1830. If not, proceed to state 1840. If, in state SB 1810, a was not greater b, proceed to state SC 1820. Set b=RC. If a>b, proceed to state 1850. If not, proceed to state 1860. Note that after receiving a valid peak, two cycles later the state machine will be in one of states 1830-1860.

In states 1830-1860, one or more of the 7-bin sorters are run with various inputs. In state 1830, the candidate is larger than SA and all lower bin values. The candidate will fall into one of the bins of Sort 0, or if it is lower than all the values in Sort 0 (indicated by Sort 0 update not asserting upon completion) it will occupy SA. Therefore, Sort 0 must be run to determine where the candidate will be located. Sorts 1-3 will also need to be updated, since the lower values will need to be shifted. Since RA-RC are interspersed between Sorts 0-3, the four sorters can be run simultaneously—no interaction will take place between the bins in one 7-bit sorter and the bins in any other 7-bin sorter. So, in step 1830, Sorts 0-3 are run, with the input to sort 0 (input 0) being the candidate, and inputs 1-3 being registers RA-RC, respectively. In step 1840, the candidate is less than or equal to SA and all the bins in Sort 0. Therefore, only Sorts 1-3 need to be run. The candidate may fall into a bin in Sort 1, or, if it is less than all the Sort 1 bins, it will replace RB (as indicated by Sort 1 update not asserting). The input to sort 1 (input 1) will be the candidate, and inputs 2 and 3 will be RB and RC, respectively. Note that Sort 0 can optionally be run, with the candidate as its input, but it is already known that the candidate will not fall into a bin in Sort 0.

In step 1850, the candidate is less than or equal to SB, and all the bins in Sort 0 and Sort 1. Therefore, only Sorts 2 and 3 need to be run. The candidate may fall into a bin in Sort 2, or, if it is less than all the Sort 2 bins, it will replace RC (as indicated by Sort 2 update not asserting). The input to sort 2 (input 2) will be the candidate, and input 3 will be RC. Note that Sorts 0 and 1 can optionally be run, with the candidate as their input, but it is already known that the candidate will not fall into a bin in Sort 0 or 1. In step 1860, the candidate is less than or equal to SC, and all the bins in Sorts 0-2. Therefore, only Sort 3 needs to be run. The candidate may fall into a bin in Sort 3, or, if it is less than all the Sort 3 bins, it will be discarded (as indicated by Sort 3 update not asserting). The input to sort 3 (input 3) will be the candidate. Note that Sorts 0-2 can optionally be run, with the candidate as their input, but it is already known that the candidate will not fall into a bin in Sort 0, 1 or 2.

After the sorts are completed in either of states 1830-1860, which take 3 cycles in the exemplary embodiment, the bins in Sorts 0-3 will be correct. RA, RB and RC may need to be updated. During state 1830, RA, RB and RC will all need to be updated. During state 1840, RB and RC will need to be updated. During state 1850, RC will need to be updated. During state 1860, no additional registers need to be updated since R6 of Sort 3, or the candidate, if it is smaller than all the bins in Sort 3, will simply be discarded. Table 9, below, summarizes the above discussion relating to inputs for Sorts 0 through 3 and updating registers RA through RC. In Table 9, RA', RB', and RC' are the next values to be stored in registers RA, RB and RC, respectively.

TABLE 9

| Operation | Conditions |
| --- | --- |
| Input 0 ← candidate | SA AND (a > b) |
| Input 1 ← candidate | SA AND (NOT a > b) |
| Input 1 ← RA | SA AND (a > b) |
| Input 2 ← candidate | SC AND (a > b) |
| Input 2 ← RB | SA |
| Input 3 ← candidate | SC AND (NOT a > b) |
| Input 3 ← RC | SA OR (SC AND a > b) |
| RA' ← Sort 0 R6 | Sort 0 update asserted |
| RA' ← candidate | State 1830 AND Sort 0 update not asserted |
| RB' ← Sort 1 R6 | Sort 1 update asserted |
| RB' ← candidate | State 1840 AND Sort 1 update not asserted |
| RC' ← Sort 2 R6 | Sort 2 update asserted |
| RC' ← candidate | State 1850 AND Sort 2 update not asserted |

Note also that the foregoing discussion has used the signals, codes and parameters defined in the W-CDMA standard as the exemplary signals, codes and parameters. This is for clarity of discussion only, and does not limit the scope of the present invention to W-CDMA systems. The principles of the present invention pertaining to step one search apply equally to any conceivable system which employs a code for identifying slot timing. As stated repeatedly throughout the description above, the principles which apply to step three searching and multimode searching apply to any conceivable system using pilot codes, and various examples such as W-CDMA, cdma2000, and IS-95 are exemplary only and should not be construed as limitations. Various combinations of slot-timing codes and pilot codes are anticipated and fall within the scope of the present invention. Those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication apparatus operable in a communication system, the apparatus comprising:
   a first module configured to detect, in a first mode, a first pilot sequence transmitted during a portion of a slot, wherein the first pilot sequence is used to identify slot timing; and
   a second module configured to detect a second pilot sequence based on, at least in part, the identified slot timing, the second pilot sequence identifying information associated with a base station group,
   the first module further configured to detect, in a second mode, a third pilot sequence which is transmitted continuously and used to scramble transmitted data, wherein the third pilot sequence is used to de-scramble the transmitted data, wherein the third pilot sequence identifies information associated with a transmitting base station of the base station group and is used for communication with the transmitting base station.

2. The apparatus of claim 1, wherein the second pilot sequence identifies at least one of frame timing and base station group information.

3. A wireless communication apparatus operable in a communication system, the apparatus comprising:
   means for receiving at least one of a first pilot sequence, a second pilot sequence, and a third pilot sequence; and
   first means for detecting, wherein the first detecting means is configured to detect the first pilot sequence transmitted during a portion of a slot, wherein the first pilot sequence is used to identify slot timing;
   second means for detecting configured to detect the second pilot sequence based on, at least in part, the identified slot timing, and
   the first means for detecting further configured to detect the third pilot sequence which is transmitted continuously and used to scramble transmitted data, wherein the third pilot sequence is used to de-scramble data, wherein the third pilot sequence identifies information associated with a transmitting base station of the base station group and is used for communication with the transmitting base station.

4. The apparatus of claim 3, wherein the second pilot sequence identifies at least one of frame timing and base station group information.

5. A method of communicating in a communication system, the method comprising:
   detecting, at a first module in a first mode, a first pilot sequence transmitted during a portion of a slot, wherein the first pilot sequence is used to identify slot timing;
   detecting, at a second module, a second pilot sequence based on, at least in part, the identified slot timing; and
   detecting, at the first module in a second mode, a third pilot sequence which is transmitted continuously and used to scramble transmitted data, wherein the third pilot sequence is used to de-scrambling data, wherein the third pilot sequence identifies information associated with a transmitting base station of the base station group and is used for communication with the transmitting base station.

6. The method of claim 5, wherein the second pilot sequence identifies at least one of frame timing and base station group information.

7. A computer program product, comprising:
   computer-readable, non-transitory medium comprising:
      code for causing a computer to detect, at a first module in a first mode, a first pilot sequence transmitted during a portion of a slot, wherein the first pilot sequence is used to identify slot timing;
      code for causing a computer to detect, at a second module a second pilot sequence based on, at least in part, the identified slot timing; and
      code for causing a computer to detect, at the first module in a second mode, a third pilot sequence which is transmitted continuously and used to scramble transmitted data, wherein the third pilot sequence is used to de-scrambling data, wherein the third pilot sequence identifies information associated with a transmitting base station of the base station group and is used for communication with the transmitting base station.

8. The computer program product of claim 7, wherein the second pilot sequence identifies at least one of frame timing and base station group information.

9. A wireless communication apparatus operable in a communication system, the apparatus comprising:
   a receiver configured to receive a signal comprising a first pilot sequence transmitted during a portion of a slot, a second pilot sequence transmitted during a portion of each slot for a plurality of slots comprising a frame, and a third pilot transmitted continuously;
   a first module configured to detect the first pilot sequence and identify slot timing based on, at least in part, the first pilot sequence;
   a second module configured to detect the second pilot sequence, based on, at least in part, the identified slot timing, and identify frame timing and base station group information based on, at least in part, the second pilot sequence; and
   wherein the first module is further configured to detect the third pilot sequence, based on, at least in part, at least one of the identified frame timing and base station group information, wherein the third pilot sequence identifies information associated with a transmitting base station of the base station group and is used for communication with the transmitting base station.

10. The apparatus of claim 9, wherein the third pilot sequence is used to de-scramble data transmitted by a transmitting base station.

11. A wireless communication apparatus operable in a communication system, the apparatus comprising:
    means for receiving a signal comprising a first pilot sequence transmitted during a portion of a slot, a second pilot sequence transmitted during a portion of each slot for a plurality of slots comprising a frame, and a third pilot transmitted continuously;
    first means for detecting the first pilot sequence and identifying slot timing based on, at least in part, the first pilot sequence;
    second means for detecting the second pilot sequence, based on, at least in part, the identified slot timing, and identifying frame timing and base station group information based on, at least in part, the second pilot sequence; and
    wherein the first detecting means is further configured to detect the third pilot sequence based on, at least in part, at least one of the identified frame timing and base station group information, wherein the third pilot sequence identifies information associated with a transmitting base station of the base station group and is used for communication with the transmitting base station.

12. The apparatus of claim 11, wherein the third pilot sequence is used to de-scramble data transmitted by a transmitting base station.

13. A method of communicating in a communication system, the method comprising:
    receiving a signal comprising a first pilot sequence transmitted during a portion of a slot, second pilot sequence transmitted during a portion of each slot for a plurality of slots comprising a frame, and a third pilot transmitted continuously;
    detecting the first pilot sequence and identifying slot timing based on, at least in part, the first pilot sequence, at a first module;
    detecting the second pilot sequence, based on, at least in part, the identified slot timing, and identifying frame timing and base station group information based on, at least in part, the second pilot sequence, at a second module; and
    detecting the third pilot sequence, based on, at least in part, at least one of the identified frame timing and base station group information, at the first module, wherein the third pilot sequence identifies information associated with a transmitting base station of the base station group and is used for communication with the transmitting base station.

14. The method of claim 13, wherein the third pilot sequence is used to de-scramble data transmitted by a transmitting base station.

15. A computer program product, comprising:
    computer-readable, non-transitory medium comprising:
    code for causing a computer to receive a signal comprising a first pilot sequence transmitted during a portion of a slot, a second pilot sequence transmitted during a portion of each slot for a plurality of slots comprising a frame, and a third pilot transmitted continuously;
    code for causing a computer to detect the first pilot sequence and identify slot timing based on, at least in part, the first pilot sequence, at a first module;
    code for causing a computer to detect the second pilot sequence, based on, at least in part, the identified slot timing, and identify frame timing and base station group information based on, at least in part, the second pilot sequence, at a second module; and
    code for causing a computer to detect the third pilot sequence, based on, at least in part, at least one of the identified frame timing and base station group information, at the first module,
    wherein the third pilot sequence identifies information associated with a transmitting base station of the base station group and is used for communication with the transmitting base station.

16. The computer program product of claim 15, wherein the third pilot sequence is used to de-scramble data transmitted by a transmitting base station.

17. A wireless communication apparatus operable in a communication system, the apparatus comprising:
    a receiver configured to receive a signal divided by frames, the frames comprising a plurality of slots, the signal comprising a first pilot sequence transmitted during a portion of each slot, a second pilot sequence, the second pilot sequence being a concatenation of a subset of sequences drawn from a larger set of sequences, the subset identifying a base station group of a transmitting base station, each of the subset of sequences transmitted during the portion of a slot coincident with the transmission of the first pilot sequence, and a third pilot sequence, continuously transmitted periodically with each frame, the third pilot sequence identifying information associated with the transmitting base station of the base station group and used for communication therewith;
    a first module configured to detect the first pilot sequence, deriving slot timing therefrom, and detect the third pilot sequence using derived frame timing and base station group information; and
    a second module configured to detect the second pilot sequence and derive frame timing and base station group information therefrom, the detection of the second pilot sequence using slot timing derived in the first module, and provide the derived frame timing and base station group information thereto.

18. The apparatus of claim 17, further operable with a second communication system comprising a plurality of base stations, each of which transmits a fourth pilot sequence for identification therefrom, wherein the first module detects the fourth pilot sequence.

19. The apparatus of claim 17, wherein the third pilot sequence is used to descramble data transmitted by the transmitting base station.

20. A wireless communication apparatus operable in a communication system, the apparatus comprising:
   means for receiving a signal divided by frames, the frames comprising a plurality of slots, the signal comprising a first pilot sequence transmitted during a portion of each slot, a second pilot sequence, the second pilot sequence being a concatenation of a subset of sequences drawn from a larger set of sequences, the subset identifying a base station group of a transmitting base station, each of the subset of sequences transmitted during the portion of a slot coincident with the transmission of the first pilot sequence, and a third pilot sequence, continuously transmitted periodically with each frame, the third pilot sequence identifying information associated with the transmitting base station of the base station group and used for communication therewith;
   first means for detecting the first pilot sequence, deriving slot timing based on, at least in part, the first pilot sequence, and detecting the third pilot sequence using derived frame timing and base station group information; and
   second means for detecting the second pilot sequence and deriving frame timing and base station group information based on, at least in part, the second pilot sequence, the detection of the second pilot sequence using slot timing derived in the first detecting means, and providing the derived frame timing and base station group information thereto.

21. The apparatus of claim 20, further operable with a second communication system comprising a plurality of base stations, each of which transmits a fourth pilot sequence for identification therefrom, wherein the first means further detects the fourth pilot sequence.

22. The apparatus of claim 20, wherein the third pilot sequence is used to descramble data transmitted by the transmitting base station.

23. A method of communicating in a communication, the method comprising:
   receiving a signal divided by frames, the frames comprising a plurality of slots, the signal comprising the first pilot sequence transmitted during a portion of each slot, a second pilot sequence, the second pilot sequence being a concatenation of a subset of sequences drawn from a larger set of sequences, the subset identifying a base station group of a transmitting base station, each of the subset of sequences transmitted during the portion of a slot coincident with the transmission of the first pilot sequence, and a third pilot sequence, continuously transmitted periodically with each frame, the third pilot sequence identifying information associated with the transmitting base station of the base station group and used for communication therewith;
   detecting the first pilot sequence, deriving slot timing based on, at least in part, the first pilot sequence, and detecting the third pilot sequence using derived frame timing and base station group information, at a first module; and
   detecting the second pilot sequence and deriving frame timing and base station group information based on, at least in part, the second pilot sequence, the detection of the second pilot sequence using slot timing derived in the first module, and providing the derived frame timing and base station group information thereto, at a second module.

24. The method of claim 23, further comprising detecting a fourth pilot sequence transmitted by at least one base station in a second communication system, at the first module.

25. The method of claim 23, wherein the third pilot sequence is used to de-scramble data transmitted by the transmitting base station.

26. A computer program product, comprising:
   computer-readable, non-transitory medium comprising:
   code for causing a computer to receive a signal divided by frames, the frames comprising a plurality of slots, the signal comprising a first pilot sequence transmitted during a portion of each slot, a second pilot sequence, the second pilot sequence being a concatenation of a subset of sequences drawn from a larger set of sequences, the subset identifying a base station group of a transmitting base station, each of the subset of sequences transmitted during the portion of a slot coincident with the transmission of the first pilot sequence, and a third pilot sequence, continuously transmitted periodically with each frame, the third pilot sequence identifying information associated with the transmitting base station of the base station group and used for communication therewith;
   code for causing a computer to detect the first pilot sequence, derive slot timing based on, at least in part, the first pilot sequence, and detect the third pilot sequence using derived frame timing and base station group information, at a first module; and
   code for causing a computer to detect the second pilot sequence and derive frame timing and base station group information based on, at least in part, the second pilot sequence, the detection of the second pilot sequence using slot timing derived in the first module, and provide the derived frame timing and base station group information thereto, at a second module.

27. The computer program product of claim 26, further comprising code for causing a computer to detect a fourth pilot sequence transmitted by at least one base station in a second communication system, at the first module.

28. The computer program product of claim 26, wherein the third pilot sequence is used to de-scramble data transmitted by the transmitting base station.

* * * * *